US012761964B2

(12) United States Patent
Fozard et al.

(10) Patent No.: US 12,761,964 B2
(45) Date of Patent: Oct. 13, 2026

(54) METHODS AND SYSTEMS FOR TIME-BOUNDING EXECUTION OF COMPUTING WORKFLOWS

(71) Applicant: Channel One Holdings Inc., Tampa, FL (US)

(72) Inventors: Damian Brunt Fozard, Waterloo (CA); Kenneth Wenger, Waterloo (CA); Stephen Richard Viggers, Waterloo (CA)

(73) Assignee: LYNX SOFTWARE TECHNOLOGIES, INC., Campbell, CA (US)

( * ) Notice: Subject to any disclaimer, the term of this patent is extended or adjusted under 35 U.S.C. 154(b) by 294 days.

(21) Appl. No.: 17/067,283

(22) Filed: Oct. 9, 2020

(65) Prior Publication Data

US 2021/0109796 A1 Apr. 15, 2021

Related U.S. Application Data

(60) Provisional application No. 62/985,506, filed on Mar. 5, 2020, provisional application No. 62/913,541, filed on Oct. 10, 2019.

(51) Int. Cl.
*G06F 9/50* (2006.01)
*G06F 9/38* (2018.01)
(Continued)

(52) U.S. Cl.
CPC .......... *G06F 9/5044* (2013.01); *G06F 9/3836* (2013.01); *G06F 9/48* (2013.01);
(Continued)

(58) Field of Classification Search
CPC ........ G06F 9/48; G06F 9/4806; G06F 9/4843; G06F 9/485; G06F 9/4881; G06F 9/50;
(Continued)

(56) References Cited

U.S. PATENT DOCUMENTS 9,916,183 B2 * 3/2018 He ........................ G06F 9/4881
2009/0193427 A1 7/2009 Pu et al.
(Continued)

FOREIGN PATENT DOCUMENTS

WO 2014031917 A1 2/2014

OTHER PUBLICATIONS

Copenheaver, Blaine R., PCT International Search Report, PCT Application No. PCT/US2020/055041, Mar. 31, 2021, 7 pages.
(Continued)

*Primary Examiner* — Charles M Swift
(74) *Attorney, Agent, or Firm* — Woods Oviatt Gilman LLP; Dennis B. Danella, Esq.

(57) ABSTRACT

Methods and systems are provided herein for a safety-critical computing platform. The safety-critical platform includes: (a) at least one physical device which is operable to execute at least one data processing operation; and (b) a processor, the processor operatively coupled to the at least one physical device, wherein the processor executes application software which generates and transmits, to the at least one physical device, instructions for executing the at least one data processing operation.

21 Claims, 16 Drawing Sheets

(51) Int. Cl.
*G06F 9/48* (2006.01)
*G06N 3/02* (2006.01)

(52) U.S. Cl.
CPC .......... *G06F 9/4806* (2013.01); *G06F 9/4843* (2013.01); *G06F 9/485* (2013.01); *G06F 9/4881* (2013.01); *G06F 9/50* (2013.01); *G06F 9/5005* (2013.01); *G06F 9/5027* (2013.01); *G06F 9/5038* (2013.01); *G06F 9/505* (2013.01); *G06F 9/5083* (2013.01); *G06N 3/02* (2013.01)

(58) Field of Classification Search
CPC .... G06F 9/5005; G06F 9/5027; G06F 9/5038; G06F 9/5044; G06F 9/505; G06F 9/5083
See application file for complete search history.

(56) References Cited

U.S. PATENT DOCUMENTS

2010/0235146 A1 9/2010 Bennett et al.
2011/0023049 A1 1/2011 Dettinger et al.
2015/0082314 A1* 3/2015 Suzuki .................... G06F 9/54 718/102
2015/0121391 A1* 4/2015 Wang .................... G06F 9/5044 718/104
2015/0143364 A1* 5/2015 Anderson ............. G06F 9/5016 718/1
2016/0098292 A1* 4/2016 Boutin .................... G06F 9/505 718/104
2018/0300847 A1 10/2018 Vembu et al.
2019/0068693 A1* 2/2019 Bernat .................. H04L 43/065
2019/0087232 A1* 3/2019 Bergsma ............... G06F 9/5038
2019/0102224 A1* 4/2019 Bernat .................... G06F 9/485
2020/0210832 A1 7/2020 Driscoll

OTHER PUBLICATIONS

Copenheaver, Blaine R., PCT International Written Opinion, PCT Application No. PCT/US2020/055041, Mar. 31, 2021, 8 pages.
Kirchler, Dominik, "Extended European Search Report," search completed Sep. 19, 2023, mailed Sep. 28, 2023 for European Application No. EP 20875063.8, The Hague (13 pages).

* cited by examiner

METHODS AND SYSTEMS FOR TIME-BOUNDING EXECUTION OF COMPUTING WORKFLOWS

CROSS-REFERENCE TO RELATED APPLICATIONS

This application claims the benefit of U.S. Provisional Patent Application No. 62/913,541, filed Oct. 10, 2019, and U.S. Provisional Patent Application No. 62/985,506, filed Mar. 5, 2020, and the entire contents of Application Nos. 62/913,541 and 62/985,506 are incorporated herein by reference.

FIELD

The described embodiments relate to computing platforms, and in particular, to a system and method for time-bounding execution of computing workflows.

INTRODUCTION

Computing platforms are used for carrying-out various data processing operations. In one example application, computing platforms can be used for implementing neural network algorithms. For instance, the neural network algorithms may be used for object recognition and collision prevention in a collision avoidance system for autonomous vehicles. In other cases, the neural network algorithms can analyze traffic flow with a view to detecting anomalies and/or to identify the presence of unscrupulous actors operating on the network. In another example application, computing platforms can be used for digital signal processing, including performing Fast Fourier Transforms (FFTs). In various cases, computing platforms can be configured to perform more than one data processing operation (e.g. performing neural network computations, FFT operations, etc.).

SUMMARY OF THE VARIOUS EMBODIMENTS

In a broad aspect, there is provided a method for operating a computer system for performing time-bounding execution of a workflow, the workflow comprising a plurality of executable instructions, the computer system comprising at least a central processing unit (CPU) and at least one specialized processor having a parallelized computing architecture, the method comprising operating the CPU to: identify a resource requirement for executing the workflow; determine a resource constraint for the at least one specialized processor; based on the resource requirement and the resource constraint, determine whether the at least one specialized processor can execute the workflow, wherein if the at least one specialized processor can execute the workflow, transmitting the workflow to the at least one specialized processor for execution, otherwise configuring the at least one specialized processor to execute the workflow, and transmitting the workflow for execution on the at least one specialized processor.

In some embodiments, the at least one specialized processor is selected from the group consisting of a graphic processing unit (GPU), a neural processing unit (NPU), a tensor processing unit (TPU), a neural network processor (NNP), an intelligence processing unit (IPU) or a vision processing unit (VPU).

In some embodiments, the method further comprises operating the at least one specialized processor to execute the workflow to generate one or more corresponding execution states.

In some embodiments, the computer system further comprises a memory storage in communication with the CPU and at the at least one specialized processor, and the method further comprises operating the at least one specialized processor to store the one or more execution states in the memory storage.

In some embodiments, the method further comprises receiving, from the at least one specialized processor, one or more execution states associated with the executed workflow.

In some embodiments, receiving the one or more execution states comprises: retrieving, by the CPU, the one or more execution states from the memory storage.

In some embodiments, the resource requirements for executing the workflow comprise at least one of memory availability requirement or processing capacity requirement.

In some embodiments, the resource constraints for executing the workflow comprise at least one of a memory availability constraint or a processing capacity constraint.

In some embodiments, determining that at least one specialized processor can execute the workflow comprises determining that the at least one specialized processor can execute the workflow in a pre-determined time corresponding to a healthy case execution time (HCET).

In some embodiments, configuring the at least one specialized processor comprises at least one of: increase the number of compute resources associated with the at least one specialized processor for executing the workflow, terminating execution of low priority workloads on the at least one specialized processor, configuring low priority workloads executing on the at least one specialized processor to use less compute resources.

In another broad aspect, there is provided for time-bounding execution of a workflow, the workflow comprising a plurality of executable instructions, the system comprising at least a central processing unit (CPU) and at least one specialized processor having a parallelized computing architecture, the CPU being operable to: identify a resource requirement for executing the workflow; determine a resource constraint for the at least one specialized processor; based on the resource requirement and the resource constraint, determine whether the at least one specialized processor can execute the workflow, wherein if the at least one specialized processor can execute the workflow, transmitting the workflow to the at least one specialized processor for execution, otherwise configuring the at least one specialized processor to execute the workflow, and transmitting the workflow for execution on the at least one specialized processor.

In another broad aspect, there is provided a system for time-bounding execution of neural network-based workloads, the system comprising: a storage medium storing a plurality of neural network models; at least one processing unit comprising a plurality of compute resource units; a general processing unit, the general processing unit configured to: instantiate and execute a neural network management module, wherein execution of the neural network management module comprises: loading at least one neural network model of the plurality of neural network models from the storage medium, each neural network model defining at least one inference engine; for each selected model of the at least one neural network models that is loaded: allocating at least one of the plurality of compute resource units to the at least one inference engine associated with the selected model; receiving a workload request for execution using the selected model; and instructing the at least one of the plurality of compute resource units allocated to the at least one inference engine associated with the selected model to execute a workload identified in the workload request.

In some embodiments, the at least one processing unit is selected from the group consisting of a graphic processing unit (GPU), a neural processing unit (NPU), a tensor processing unit (TPU), a neural network processor (NNP), an intelligence processing unit (IPU) or a vision processing unit (VPU).

In some embodiments, the system further comprises a secondary storage medium for storing neural network models, and wherein loading the at least one neural network model comprises retrieving the neural network model from the secondary storage medium.

In some embodiments, the workload is a high-priority workload.

In some embodiments, the general processing unit is further configured to: monitor an execution time of the high-priority workload on the at least one processing unit; and determine if the execution time has exceeded a Healthy Case Execution Time (HCET).

In some embodiments, the HCET comprises a pre-determined range of expected execution time.

In some embodiments, the execution of the neural network management module further comprises exposing an API to the application to assign at least one of a priority level or a healthy execution time to the selected model.

In some embodiments, if the execution time has exceeded the HCET, the general processing unit is further configured to: modify an execution profile configuration on the at least one processing unit to a high priority execution profile configuration.

In some embodiments, if the execution time has exceeded the HCET, the general processing unit is further configured to: transmit a notification alert to an application, wherein the application is stored on the storage medium, and the application is associated with the selected model.

In some embodiments, in the high priority execution profile configuration, the general processing unit is further configured to increase the number of compute resource units assigned to executing the high-priority workload.

In some embodiments, in the high priority execution profile configuration, the general processing unit is further configured to instruct the at least one processing unit to cease execution of one or more other workload request, and re-allocate a subset of compute resources from the one or more other workload request to the high-priority workload.

In some embodiments, in the high priority execution profile configuration, the general processing unit is further configured to instruct the at least one processing unit to reduce execution effort for one or more other workload request, and increase execution effort for the high-priority workload.

In some embodiments, in the high priority execution profile configuration, the general processing unit is further configured to instruct the at least one processing unit to modify an execution of the at least one inference engine to concurrently execute batches of requests associated with the high-priority workload.

In some embodiments, the one or more compute resource units comprise at least one of a hardware execution unit, a memory unit and an execution cycle.

In some embodiments, the neural network manager is further configured to receive a query from an application operating on the at least one processing unit and respond to the query.

In some embodiments, the query relates to one or more of: a number of physical devices in the system, a type of physical devices in the system, a support of physical devices for computer resource reservation and allocation, an indication of previously generated inference engines, an indication of compute resource allocation to inference engines, or statistical information about inference engine execution.

In some embodiments, the general processing unit is further configured to: monitor a workload execution level of each of the plurality of compute resource units; determine an imbalance in the workload execution level between the plurality of compute resource units; and re-allocate workload from one or more compute resource units having a high workload execution level to one or more compute resource units having a low workload execution level.

In some embodiments, at least a subset of the plurality of compute resource units comprise one or more of dedicated compute resource units allocated to a corresponding inference engine, shared compute resources allocated for sharing between a plurality of inference engines, and flexible compute resource units allocatable to any inference engine.

In some embodiments, the workload request is received from an application, and allocating at least one of the compute resource units to the at least one inference engine comprises allocating at least one dedicated compute resource unit corresponding to the at least one inference engine, and execution of the neural network model for a selected model further comprises: enqueuing the workload request into the at least one inference engine; and responsive to determining execution of the workload is complete, transmit a notification to the application indicating that the execution is complete.

In some embodiments, allocating at least one of the compute resource units to the at least one inference engine comprises scheduling at least one shared compute resource unit to execute the at least one inference engine, and execution of the neural network model for a selected model further comprises: transmitting a request to a shared resource scheduler, operating on the at least one processing unit, to execute the workload request on one or more shared compute resource units.

In some embodiments, the shared resource scheduler is operable to: determine a relative priority of the workload request to other workload requests previously enqueued for the one or more shared compute resource units; and responsive to determining the workload request has a higher priority than the other workload requests, scheduling execution of the workload requests on the one or more shared compute resource units ahead of the other workload requests.

In some embodiments, the shared resource scheduler is operable to: determine a relative compute resource requirement of the workload request to other workload requests previously enqueued for the one or more shared compute resource units; and responsive to determining the workload request has a lower compute resource requirement than the other workload requests, scheduling execution of the workload requests on the one or more shared compute resource units ahead of the other workload requests.

In some embodiments, allocating at least one of the compute resource units to the at least one inference engine comprises: determining at least one execution metric associated with the selected model; based on the determination, allocating one or more flexible compute resource units to the at least one inference engine.

In some embodiments, the at least one execution metric corresponds to one or more of a execution priority of the selected model, a healthy execution time associated with the selected model, availability of flexible compute resource units, compute resource unit execution suitability for the selected model and application-specific compute resource unit requests.

In some embodiments, allocating at least one of the compute resource units to the at least one inference engine comprises a mixed compute resource unit allocation comprising two or more of designated compute resource units, shared compute resource units and flexible compute resource units.

In some embodiments, the general processing unit is further configured to: instantiate a physical device manager (PDM) module and a safety manager module, wherein the PDM is configured to receive the workload requests and to submit the workload to the at least one processing unit, and wherein the safety manager module is configured to configuring the PDM with respect to inference engines permitted to interact with the at least one processing unit.

In another broad aspect, there is provided a method for time-bounding execution of neural network-based workloads, the method comprising operating a general processing unit to: instantiate and execute a neural network management module, wherein execution of the neural network management module comprises: loading at least one neural network model of a plurality of neural network models stored on a storage medium, each neural network model defining at least one inference engine; for each selected model of the at least one neural network models that is loaded: allocating at least one of a plurality of compute resource units, corresponding to at least one processing unit, to the at least one inference engine associated with the selected model; receiving a workload request for execution using the selected model; and instructing the at least one of the plurality of compute resource units allocated to the at least one inference engine associated with the selected model to execute a workload identified in the workload request.

In one broad aspect, there is provided a system for time-bounding execution of workloads, the system comprising: at least one non-transitory computer storage medium for storing a low-level system profiling application and a profiled application, the profiled application being configured to generate one or more executable workloads; at least one processor for executing workloads generated by the profiled application; a general processor, operatively coupled to the storage medium, the processor being configured to execute the low-level profiling application to: profile a plurality of system characteristics; execute one or more system performance tests; based on the profiling and the performance tests, determine a predicted worst case execution time (WCET) metric for a given executable workload generated by the profiled application on at least one processor.

In some embodiments, the at least one processor comprises an at least one specialized processor, and wherein profiling the plurality of system characteristics comprises profiling a plurality of system characteristics for the at least one specialized processor, and executing the one or more system performance tests comprises executing one or more system performance tests on the at least one specialized processor.

In some embodiments, the at least one specialized processor is selected from the group consisting of a graphic processing unit (GPU), a neural processing unit (NPU), a tensor processing unit (TPU), a neural network processor (NNP), an intelligence processing unit (IPU) or a vision processing unit (VPU).

In some embodiments, the at least one processor comprises at least one central processing unit (CPU), and profiling the plurality of system characteristics comprises profiling a plurality of system characteristics for the CPU, and the executing one or more system performance tests comprises executing one or more system performance tests on the CPU.

In some embodiments, profiling the plurality of system characteristics comprises profiling a system memory to determine at least one of: memory read and write operation performance, memory access performance across memory address ranges, cache hits and misses, page faults and loads and memory bus performance.

In some embodiments, profiling the plurality of system characteristics comprises profiling the storage medium to determine at least one of: storage access performance across storage location address ranges, cache hits and misses and storage access performance.

In some embodiments, profiling the plurality of system characteristics comprises profiling at least one of: a system bus performance across various load conditions, networking performance, messaging and inter-process communication performance, synchronization privatives and system scheduler performance.

In some embodiments, profiling the plurality of system characteristics comprises profiling scheduler performance for the at least one specialized processor.

In some embodiments, profiling the plurality system characteristics comprises generating a system map of all system devices and system inter-connections.

In some embodiments, the at least one profiled application is configured to generate both machine learning models and neural network based workloads executable using the machine learning models, and profiling the plurality system characteristics comprises exposing an API to allow the application to provide characteristic data for the machine learning models.

In some embodiments, executing the one or more system performance tests comprises executing the one or more workloads, generated by the profiled application using the one or more machine learning models, and monitoring one or more execution metrics.

In some embodiments, executing the one or more system performance tests comprises executing a plurality of workloads, generated by the application using a plurality of machine learning models, and monitoring changes to the one or more execution metrics in response to executing different workloads of the plurality of workloads.

In some embodiments, the executing the one or more system performance tests comprises executing one or more workloads in an optimized environment, and measuring one or more optimized execution metrics.

In some embodiments, the optimized environment is generated by at least one of: modifying a configuration of a neural network workload generated by the application, introducing excessive memory bus utilization and executing misbehaving test applications.

In another broad aspect, there is provided a method for time-bounding execution of workloads, the method comprising executing, by at least one general processing unit, a low-level system profiling application stored on at least one non-transient memory to: profile a plurality of system characteristics; execute one or more system performance tests; based on the profiling and the performance tests, determine a predicted worst case execution time (WCET) metric for a given executable workload generated by a profiled application, stored on the at least one non-transient memory, on at least one processor of the system.

In another broad aspect, there is provided a system for time-bounding execution of workloads, the system comprising: a storage medium for storing an application, wherein the application is operable to generate workloads; a central processing unit (CPU) configured to execute the application; at least one specialized processing unit for executing workloads generated by the application, the at least one specialized processing unit having a processor scheduler, wherein the processor scheduler is operable between: a non safety-critical scheduler mode in which the processor scheduler is non-deterministic with respect to scheduling parameters, and a safety-critical scheduler mode in which the processor scheduler is deterministic with respect to scheduling parameters.

In some embodiments, the processor scheduler varies operation between the non safety-critical scheduler mode and the safety-critical scheduler mode based on instructions received from the application.

In some embodiments, the processor scheduler is operating in a first mode to execute an initial workload request, and the application generates a new workload request for execution on the at least one specialized processing unit, and wherein the application instructs the processor scheduler to: cache an execution state associated with the initial workload request executing in the first scheduling mode; operate in a second scheduling mode to execute the new workload request; and responsive to completing execution of the new workload request, operate in the first scheduling mode to continue execution of the initial workload request based on the cached execution state.

In some embodiments, the first mode is the non safety-critical scheduler mode, and the second mode is the safety-critical scheduler mode.

In some embodiments, the processor scheduler is operating in a first scheduling mode to execute an initial workload, and the application generates a new workload request for execution on the at least one specialized processing unit, and wherein the application instructs the processor scheduler to: terminate execution of the initial workload request executing in the first scheduling mode; operate in a second scheduling mode to execute the new workload request; and responsive to completing execution of the new workload request, operate in the first scheduling mode for further workload requests.

In some embodiments, the first mode is the non safety-critical scheduler mode, and the second mode is the safety-critical scheduler mode.

In some embodiments, the processor scheduler is operating in a first scheduling mode to execute an initial workload, and the application generates a new workload request for execution on the at least one specialized processing unit, and wherein the application instructs the processor scheduler to: at least one of terminate execution of the initial workload request executing in the first scheduling mode or cache an execution state associated with the initial workload request; operate in a second scheduling mode to execute the new workload request; and responsive to completing execution of the new workload request, operate in the second mode to one of: receive further workload requests, or continue execution of the initial workload request based on the cached execution state.

In some embodiments, the first and second mode are at least one of a non safety-critical scheduler mode and the safety-critical scheduler mode.

In some embodiments, the at least one specialized processor unit is selected from the group consisting of a graphic processing unit (GPU), a neural processing unit (NPU), a tensor processing unit (TPU), a neural network processor (NNP), an intelligence processing unit (IPU) or a vision processing unit (VPU).

In some embodiments, the application determines a worst case execution time (WCET) for executing the workload on the at least one specialized processing unit, the WCET being determined based on at least a WCET variable ($T_{schWg}$) corresponding to a time waiting period for a compute unit of the at least one processor to complete an execution event, and in the safety-critical mode $T_{schWg}$ is a highly deterministic variable for determining WCET, and in the non safety-critical scheduling mode $T_{schWg}$ is a poorly deterministic variable for determining WCET. The non-safety critical scheduler mode can be optimized for performance over safety, and the safety critical schedule mode can be optimized for safety over performance.

In another broad aspect, there is provided a method for time-bounding execution of workloads, comprising: providing a storage medium for storing an application, wherein the application is operable to generate workloads; providing a central processing unit (CPU) configured to execute the application; providing at least one specialized processing unit, wherein the at least specialized processing unit is configured to execute workloads generated by the application, the at least one specialized processing unit having a processor scheduler, wherein the processor scheduler is operable between: a non safety-critical scheduler mode in which the processor scheduler is non-deterministic with respect to scheduling parameters, and a safety-critical scheduler mode in which the processor scheduler is deterministic with respect to scheduling parameters.

In another broad aspect, there is provided a method for time-bounding processing of data, the method comprising operating a processing unit to: receive an input array associated with the data, the input array having a length of N elements, wherein N is a power of two; index the input array to assign index numbers to each element of the input array; generate a first row of an intermediate array by decimating the input array into an even index sub-array and an odd index sub-array, wherein the even index sub-array comprises array elements of the input array with an even index number, and the odd index sub-array comprises array elements of the input array with an odd index number; iteratively generate additional rows of the intermediate array by re-indexing and decimating each sub-array of a preceding row of the intermediate array, until a final row of the intermediate array is generated, wherein each row of the intermediate array includes a plurality of sub-array pairs, each sub-array pair corresponding to a decimated sub-array from preceding row of the intermediate array; beginning from the final row of the intermediate array, determine a Discrete Fourier Transform (DFT) for each sub-array pair, and based on the determination, updating elements in the corresponding sub-array in the previously generated FFT row; and output a DFT representation of the input array, wherein the DFT representation comprises N DFT elements.

In some embodiments, the final row of the intermediate array comprises a plurality of even and odd index sub-arrays, each having a single element.

In some embodiments, the method is applied for image processing, and the input array comprises an input array of pixel values for an input image.

In some embodiments, the method is applied for edge detection in the input image.

In some embodiments, the method is applied for audio processing, and the input array comprises an input array of audio signal values generated by sampling an input audio signal.

In some embodiments, the method is applied to decompose a multi-frequency input audio signal in one or more audio frequency components.

In some embodiments, the processing unit is a central processing unit (CPU).

In some embodiments, the processing unit is selected from the group consisting of a general-purpose graphic processing unit (GPGPU), a neural processing unit (NPU), a tensor processing unit (TPU), a neural network processor (NNP), an intelligence processing unit (IPU) or a vision processing unit (VPU).

In some embodiments, the method is performed in a safety-critical system.

In another broad aspect, there is provided a system for time-bounding processing of data, the system comprising a processing unit being operable to: receive an input array associated with the data, the input array having a length of N elements, wherein N is a power of two; index the input array to assign index numbers to each element of the input array; generate a first row of an intermediate array by decimating the input array into an even index sub-array and an odd index sub-array, wherein the even index sub-array comprises array elements of the input array with an even index number, and the odd index sub-array comprises array elements of the input array with an odd index number; iteratively generate additional rows of the intermediate array by re-indexing and decimating each sub-array of a preceding row of the intermediate array, until a final row of the intermediate array is generated, wherein each row of the intermediate array includes a plurality of sub-array pairs, each sub-array pair corresponding to a decimated sub-array from preceding row of the intermediate array; beginning from the final row of the intermediate array, determine a Discrete Fourier Transform (DFT) for each sub-array pair, and based on the determination, updating elements in the corresponding sub-array in the previously generated FFT row; and output a DFT representation of the input array, wherein the DFT representation comprises N DFT elements.

In another broad aspect, there is provided a method for processing data using a convolutional neural network (CNN), the method comprising operating at least one processor to: instantiate a plurality of layer operations associated with the CNN, the plurality of layer operations being executable in a sequence such that the outputs of one layer operation are provided as inputs to the next layer operation in the sequence; identify at least one layer operation, of the plurality of layer operations, the at least one layer operation comprising a plurality of layer-specific sub-operations; receive an input data array; and apply, iteratively, the plurality of layer operations to the input data array, wherein, in each iteration, for the at least one layer operation, a different subset of the plurality of layer-specific sub-operations is applied to the input data array, wherein the iterations are applied until all layer-specific sub-operations of the at least one layer operation are applied to the input data array, and wherein each iteration generates an intermediate output data array.

In some embodiments, the plurality of layer operations comprise a plurality of feature layer operations of the CNN.

In some embodiments, the at least one layer operation is a convolution layer, and the plurality of layer-specific operations are a plurality of filters associated with the convolution layer.

In some embodiments, the intermediate output data array, generated by each iteration, is stored in a memory storage.

In some embodiments, once all iterations are executed by the at least one processor, a plurality of intermediate output data arrays are stored in the memory storage.

In some embodiments, the CNN further comprising a classifier layer operation, and the method further comprises operating the at least one processor to: retrieve the plurality of intermediate outputs from the memory storage; apply the classifier layer operation to the plurality of intermediate outputs to generate a predictive output.

In some embodiments, the input data array is an input image comprising a plurality of image pixels.

In some embodiments, the output is a binary classification of the input image.

In some embodiments, the at least one processor is a central processing unit (CPU).

In some embodiments, the at least one processor is a specialized processor comprising at least one of a graphic processing unit (GPU), a neural processing unit (NPU), a tensor processing unit (TPU), a neural network processor (NNP), an intelligence processing unit (IPU) and a vision processing unit (VPU).

In another broad aspect, there is provided a system processing data using a convolutional neural network (CNN), the system comprising at least one processor being operable to: instantiate a plurality of layer operations associated with the CNN, the plurality of layer operations being executable in a sequence such that the outputs of one layer operation are provided as inputs to the next layer operation in the sequence; identify at least one layer operation, of the plurality of layer operations, the at least one layer operation comprising a plurality of layer-specific sub-operations; receive an input data array; and apply, iteratively, the plurality of layer operations to the input data array, wherein, in each iteration, for the at least one layer operation, a different subset of the plurality of layer-specific sub-operations is applied to the input data array, wherein the iterations are applied until all layer-specific sub-operations of the at least one layer operation are applied to the input data array, and wherein each iteration generates an intermediate output data array.

BRIEF DESCRIPTION OF THE DRAWINGS

A preferred embodiment of the present invention will now be described in detail with reference to the drawings, in which.

DESCRIPTION OF VARIOUS EMBODIMENTS

Figure 1A:
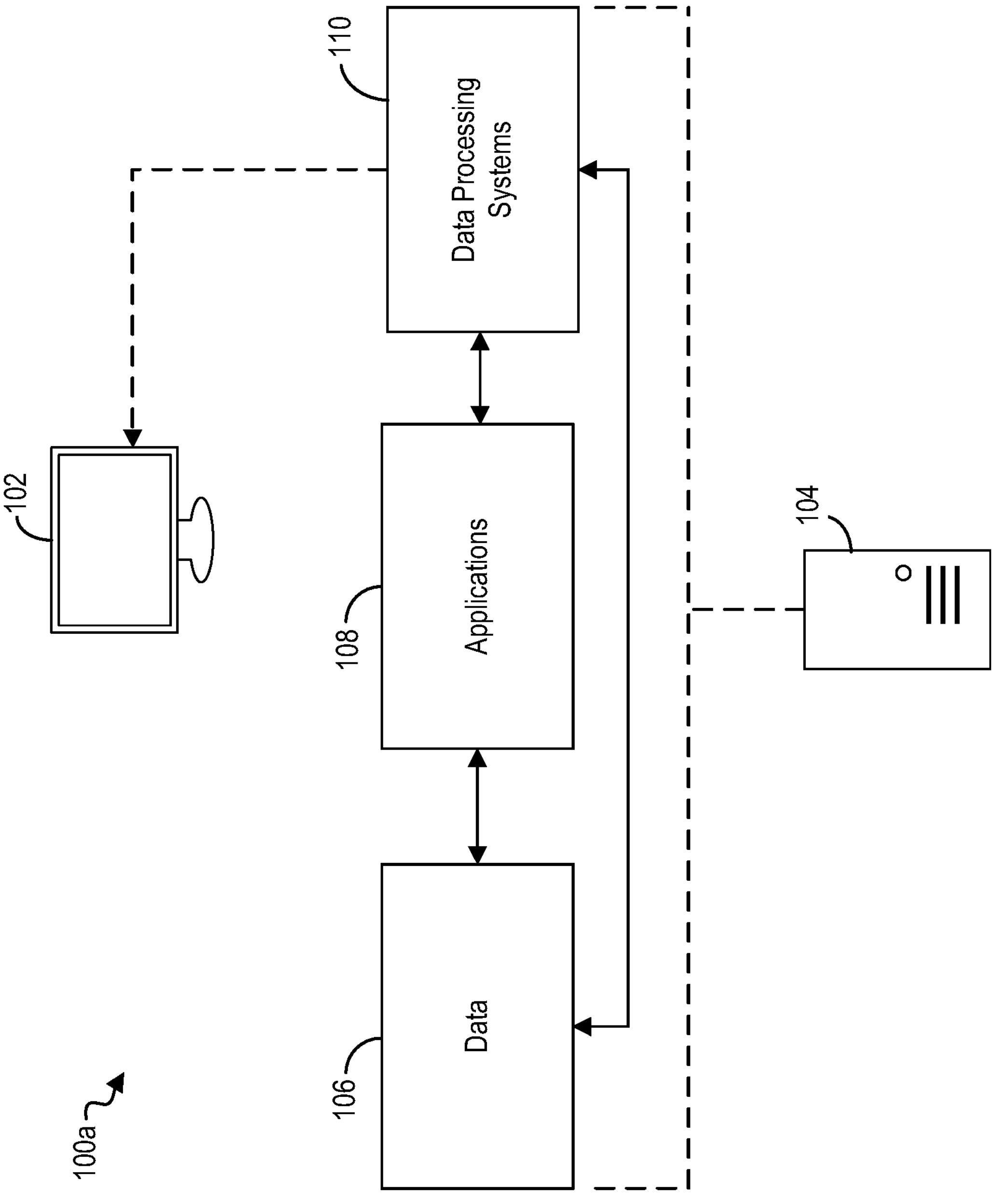
FIG. 1A is a simplified block diagram of a host computer system, according to some embodiments.

Various apparatus or processes will be described below to provide an example of one or more embodiments. No embodiment described below limits any claimed embodiment and any claimed embodiment may cover processes or apparatus that differ from those described below. The claimed embodiments are not limited to apparatus or processes having all of the features of any one apparatus or process described below or to features common to multiple or all of the apparatus described below. It is possible that an apparatus or process described below is not an embodiment of any claimed embodiment. Any embodiment disclosed below that is not claimed in this document may be the subject matter of another protective instrument, for example, a continuing patent application, and the applicants, inventors or owners do not intend to abandon, disclaim or dedicate to the public any such embodiment by its disclosure in this document.

The terms "an embodiment," "embodiment," "embodiments," "the embodiment," "the embodiments," "one or more embodiments," "some embodiments," and "one embodiment" mean "one or more (but not all) embodiments of the subject matter described in accordance with the teachings herein," unless expressly specified otherwise.

The terms "including," "comprising" and variations thereof mean "including but not limited to", unless expressly specified otherwise. A listing of items does not imply that any or all of the items are mutually exclusive, unless expressly specified otherwise. In addition, the terms "a," "an" and "the" mean "one or more," unless expressly specified otherwise.

It should also be noted that the terms "coupled" or "coupling" as used herein can have several different meanings depending in the context in which these terms are used. For example, the terms coupled or coupling can have a mechanical or electrical connotation. For example, as used herein, the terms coupled or coupling can indicate that two elements or devices can be directly connected to one another or connected to one another through one or more intermediate elements or devices via an electrical element or electrical signal (either wired or wireless) or a mechanical element depending on the particular context.

Further, although processes, methods, and the like may be described (in the disclosure and/or in the claims) having acts in a certain order, such processes and methods may be configured to work in alternate orders while still having utility. In other words, any sequence or order of actions that may be described does not necessarily indicate a requirement that the acts be performed in that order. The acts of processes and methods described herein may be performed in any order that is practical and has utility. Further, some actions may be performed simultaneously, if possible, while others may be optional, if possible.

When a single device or article is described herein, it may be possible that more than one device/article (whether or not they cooperate) may be used in place of a single device/article. Similarly, where more than one device or article is described herein (whether or not they cooperate), it may be possible that a single device/article may be used in place of the more than one device or article.

The term "GPU", as used herein, broadly refers to any graphics rendering device, as well as any device that may be capable of both rendering graphics and executing various data computations. This may include, but is not limited to discrete GPU integrated circuits, field-programmable gate arrays (FPGAs), application-specific integrated circuits (ASICs), discrete devices otherwise operable as central processing units, and system-on-a-chip (SoC) implementations. This may also include any graphics rendering device that renders 2D or 3D graphics.

The term "CPU", as used herein, broadly refers to a device with the function or purpose of a central processing unit, independent of specific graphics-rendering capabilities, such as executing programs from system memory. In some implementations, it is possible that a SoC may include both a GPU and a CPU; in which case the SoC may be considered both the GPU and the CPU.

The term Neural Processing Unit ("NPU") and Intelligence Processing Unit ("IPU"), as used herein, broadly refers to a processing unit (e.g., a microprocessor) which can be used to implement control and arithmetic logic necessary to execute machine learning algorithms by operating on predictive models such as artificial neural networks (ANNs).

The term Vision Processing Unit ("VPU"), as used herein, broadly refers to a processing unit (e.g., a microprocessor) which can be used to implement control and arithmetic logic necessary to execute machine learning algorithms using for vision tasks, by operating on predictive models such as artificial neural networks (ANNs).

The term Tensor Processing Unit ("TPU"), as used herein, broadly refers to a processing unit (e.g., an application-specific integrated circuit (ASIC) or field programmable gate array (FPGA)) which is capable of performing neural network machine learning and/or computation.

As used herein, the term data processing unit (or processing unit) may refer to any computational hardware which is capable of executing data processing operations and/or performing graphics rendering, and may include one or more CPUs, GPUs, NPUs, VPUs, IPUs and/or TPUs as well as other suitable data processing devices.

A safety-critical compute platform, or a safety-critical system, as used herein, is a system which may potentially cause serious consequences (e.g., death, serious injury, loss or damage to property or the environment) if the system fails or malfunctions. In various cases, safety-critical compute platforms, or safety-critical systems, may implement various safety-critical tasks or safety-critical operations.

As stated in the background, computing platforms are used for carrying-out various data processing operations.

In recent years the computational capabilities of personal computers and even lower-powered embedded devices have increased significantly. At least some of the increase in compute capabilities initially came from unlocking the abilities of mainstream GPUs and exploiting their banks of parallel processors, which were traditionally involved with the processing of graphics data, to perform generic mathematical computations. These same capabilities of GPUs may also be used to perform machine learning and artificial intelligence tasks. Whether for inferencing neural networks, processing image data using Sobel filters, or implementing an FFT-based (Fast Fourier Transform) edge detector for a video stream, safety critical systems generally impose the same constraint: software must execute deterministically in both space and time. Code coverage and worst-case execution time considerations are also important in safety critical applications. Traditionally, software that is intended to execute only on a CPU can be analyzed, and code coverage information can be gathered by running test cases on instrumented code generating a report outlining the lines of code that have been tested, as well as the coverage holes which must still be tested. Software that runs on a GPU, or a highly parallelized compute processor, is much more difficult to instrument; and worst-case execution time can be very difficult to estimate for these systems. The ability of general-purpose computing on GPUs (GPUs) to parallelize execution and aggressively schedule runtime threads to maximize throughput makes GPUs attractive for high volume compute operations. However, this same ability also makes it challenging for safety critical applications. In view of the foregoing, the described embodiments generally employ one or more approaches to reduce non-determinism for programs executing on a class of specialized processors characterized by highly parallelized computing processing (e.g., GPUs).

General System Overview

Referring now to FIG. 1A, there is shown a simplified block diagram of a host computer system 100*a*, according to some embodiments.

As shown, the host computer system 100*a* comprises a computer display or monitor 102, and a computer 104. Other components of the system are not shown, such as user input devices (e.g., a mouse, a keyboard, etc.). In some embodiments, the host computer system 100*a* may not include a computer display or monitor 102. As described in further detail herein, the host computer system 100*a* may be used for processing data, executing neutral networks, as well as performing other data processing operations (e.g., digital signal processing). In some embodiments, the host computer system 100*a* may also be used for displaying graphics objects or images on the display or monitor 102.

According to at least some embodiments, the host computer system 100*a* may be a computer system used in a motorized vehicle such as an autonomous vehicle, an aircraft, marine vessel, or rail transport vehicle, or in a medical imaging system, a transportation system. The computer system may also be used in any other application which requires the performance of safety-critical tasks.

The computer 104 may generally include a system memory, storage media, and a processor. In various embodiments, computer 104 may execute various applications 108 using the processor and system memory.

In one example application, host computer system 100*a* may be deployed in an autonomous vehicle, and applications 108 may provide safe autonomous operation of the vehicle. In order to provide safe autonomous operation for the vehicle, applications 108 may receive data 106. In some embodiments, data 106 can be stored and retrieved from the system memory. In other embodiments, data 106 can be acquired from one or more sensors mounted to the autonomous vehicles, and which are used for monitoring the vehicle's surrounding environment (e.g., cameras, radar or LiDAR sensors, steering wheel inputs, accelerometers, gyroscopes, etc.). Applications 108 may operate on data 106 to safely navigate the autonomous vehicle (e.g., prevent collisions). In various cases, operating on data 106 may involve, by way of non-limiting examples, processing the data using one or more neural network models, applying digital signal processing techniques (e.g., FFT operations), etc.

System 100*a* can also include data processing systems 110. The data processing system 110 can include one or more physical devices for processing data. For example, data processing system 100*a* may include physical devices for performing computations and/or rendering graphics (e.g., processing units, including Graphics Processing Units (GPUs), Central Processing Units (CPUs), Neural Processing Units (NPUs), Intelligence Processing Units (IPUs), Vision Processing Units (VPUs) and/or Tensor Processing Units (TPUs)). In particular, data processing system 110 may receive data 106, and may also receive instructions from applications 108 in respect of how to process the data.

According to at least some embodiments, the host computer system 100*a* may be a safety-critical, mission-critical, or high-reliability system. In such a case, the host computer system 100*a* may be required to comply with specific operating standards, such as standards related to reliability, safety and fault tolerance.

Figure 1B:
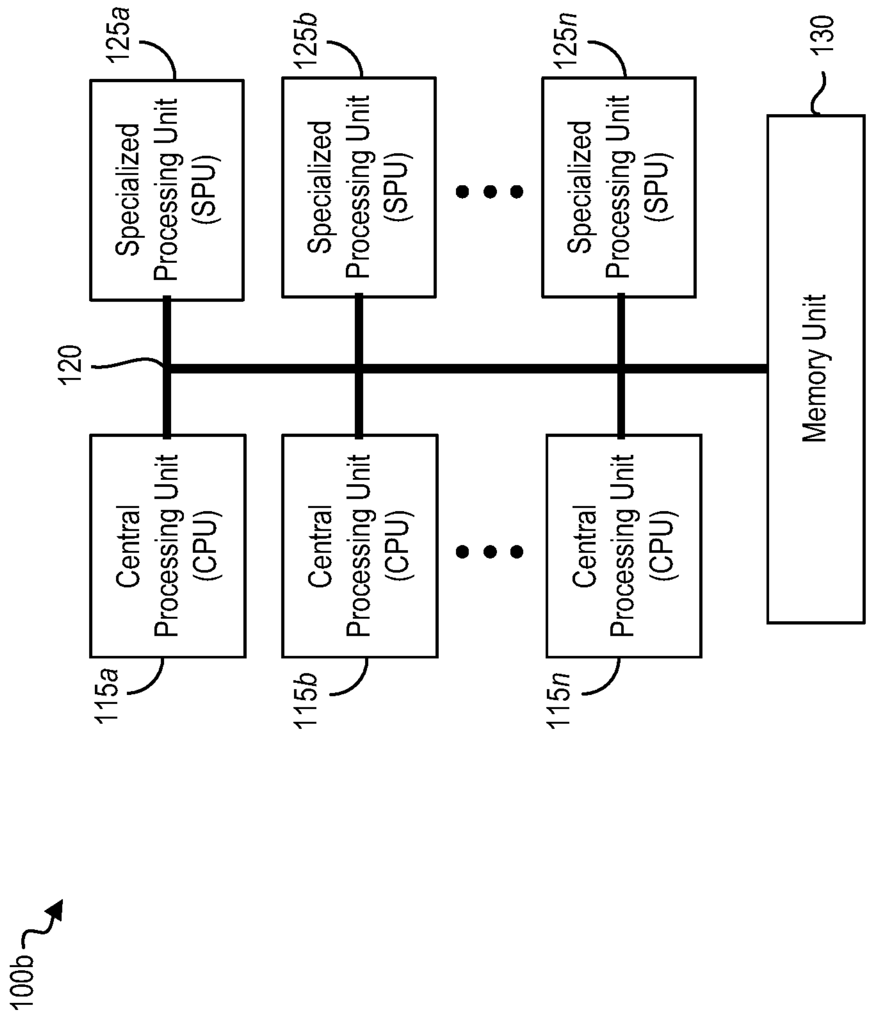
FIG. 1B is a simplified block diagram for a processor architecture, according to some embodiments.

Referring now to FIG. 1B, there is shown an example processor architecture 100*b*. The processor architecture 100*b* may be located, for example, in the computer 104 of FIG. 1A. The processing architecture 100*b* may be used for executing various compute processing operations as provided herein.

As shown, the processor architecture 100*b* includes one or more central processing units (CPUs) 115*a*-115*n* connected, via a data bus 120, to one or more specialized processing units (SPUs) 125*a*-125*n*. Processors 115, 125 may also be coupled via the data bus 120 to a memory unit 130, which can include volatile and/or non-volatile memory.

CPUs 115 can refer to general purpose microprocessors, while SPUs 125 can refer to a class of processors characterized by banks of parallel processors providing highly parallelized computing processing. In contrast to CPUs, SPUs are able to aggressively schedule runtime threads to maximize throughput, and accordingly, provide high computational efficiency. Nevertheless, despite their high computing power that can be advantageous for volume compute operations, these processors often have non-deterministic schedulers, or otherwise, scheduling functionality which is externally opaque outside the SPU, and which may be difficult to resolve by third parties using these processors. For instance, some SPUs may not provide the facility for a CPU to define different priorities for different tasks to be executed by the SPU, or to pre-empt existing tasks. Accordingly, these specialized processors may not be ideally suited for many safety-critical applications. Non-limiting examples of SPUs 125 include Graphic Processing Units (GPUs), Neural Processing Units (NPUs), Tensor Processing Units (TPUs), Neural Network Processors (NNPs), Intelligence Processing Units (IPUs) and Vision Processing Units (VPUs).

While FIG. 1B illustrates the CPUs and SPUs as being coupled via data bus 120, in other cases, one or more of the CPUs 115 and SPUs 125 may be connected to exchange data in any other communicative manner (e.g., via a wired or wireless network system).

Execution of Neural Networks

Neural network algorithms have found wide-spread application, and have been used, for example, in object recognition and collision prevention in a collision avoidance system for autonomous vehicles. Neural network algorithms have also been used in other application, including analyzing traffic flow with a view to detecting anomalies and/or to identify the presence of unscrupulous actors operating on the network.

In many cases, neural network implementations can be computationally intensive, and may require large processing power, resources and time. As neural networks are scaled to larger applications (e.g., systems produced at industrial scales), implementation becomes increasingly complex. In particular, very complex neural networks may have a multitude of "layers" and "nodes" in order to process large arrays of data. These complex networks may require large computing power, processing time and resources for implementation.

In particular, complex neural networks, which demand large processing time and resources, may not be ideally suited for safety-critical applications. This is because safety-critical tasks often require processing data within limited or short time frames, or with limited (e.g., pre-defined) computation resources. In various cases, for example, hazardous consequences may result where a collision avoidance system is unable to immediately process data using neural network-based computations.

In view of the foregoing, there is a demand for more deterministic, time- and space-bounded infrastructure for executing neural network-based computations. In particular, there is a demand for infrastructure which allows executing neural network computations in safety-critical environments and in a safety-certifiable manner.

Accordingly, various embodiments herein provide for a neural network manager (NNM) which can be used for executing workloads (e.g., neural network-based workloads) in a more deterministic, time- and space-bounded manner. The term space-bounded as used herein generally means limited in hardware and/or memory usage.

In particular, as provided herein, the neural network manager (NNM) may receive objects containing neural network design information (e.g., network topology, number of layers, number of nodes, connection information, etc.), as well as neural network-based workloads from one or more applications (e.g., safety-critical applications). In other cases, the NNM can also receive more generic non-neural net based workloads from one or more applications.

The NNM may allow applications to create (i.e., generate), and configure inference engines (as defined further elsewhere herein) to execute neural networks. The NNM may also allow applications to specify which physical devices (e.g., processing units) are allocated for executing different inference engines. The NNM thus allows applications to determine computing resource allocation for executing different compute workloads.

In some cases, to assist applications in making compute resource allocations, the NNM may also allow applications to query system capability (e.g., number of physical devices in the system, the compute capabilities of each device in the system, etc.). For example, the NNM can monitor system parameters and provide the system parameters to the application.

To ensure that execution of workloads (e.g., neural networks) is performed in a deterministic, and time- and space-bounded manner, the NNM may receive a Healthy Case Execution Time (HCET) value from each application in respect of a submitted workload. In some cases, the NNM can also receive a priority level from an application for a submitted workload.

As provide herein, the Healthy Case Execution Time (HCET) is a time allocated for executing a specific workload task (e.g. a neural network) within which a response must be returned for the execution of that neural network to be considered "healthy". The concept of HCET is important to a deterministic system so as to ensure that workload tasks, including neural net-based computations, are executed in a time-bounded manner, and that applications (e.g., safety-critical applications) receive output responses within expected time frames. This feature finds significant importance in safety-critical applications, where timely execution of workloads (e.g., neural network computations) may be required for safe operation of a system.

In at least some embodiments, the NNM can support multiple configurations to accommodate cases where "high-priority" workloads are exceeding their HCET. For instance, in at least some embodiments, the NNM can be configured to change from a "Normal Execution Profile" to a "High Priority Execution Profile". In a "High Priority Execution Profile", the NNM can increase the compute resource allocations for high priority workloads which are exceeding their HCET. The NNM can also reduce or eliminate compute resource allocations for lower priority workloads. In this manner, high priority workloads may be allocated greater compute resources to reduce their execution time. In still other cases, the NNM may stop accepting low-priority requests from applications. In this manner, computing resources are not utilized for executing low-priority requests to the detriment of high-priority requests. In still yet other cases, the NNM may reduce or eliminate processing in a processing device in order to allocate more computing power on the processing device to computations associated with high-priority workloads.

In other cases, as explained herein, the "High Priority Execution Profile" may also allow the NNM to reconfigure low-priority workloads (e.g., low priority inference engines) to consume less compute resources. For example, the NNM can configure low-priority inference engines to service every $n^{th}$ request from an application, rather than every request. Accordingly, the low-priority inference engines may be prevented from consuming excess compute resources to the benefit of high-priority inference engines. In still other cases, the NNM, can re-configure a high-priority inference engine to increase the execution speed of the inference engine.

The HCET can be determined, in some cases, by determining a "Worst Case Execution Time" (WCET) for executing a workload. The WCET is a determination, or in some cases an estimate, of what is expected to be the longest possible amount of time necessary for a compute workload to complete execution. Since the WCET may be an estimate, it can in fact exceed the actual "worst case scenario" that exists for a given workload. In some cases, an estimated value for the WCET can be used to determine the HCET value. The WCET is important to predicting, in a deterministic manner, the execution time for a NN-based operation. In at least some cases, the WCET may be calculated based on profiling various system parameters, including detailed system information, system characteristic and performance information, and 'real-world' and augmented 'real-world' benchmarking of target hardware. In at least some cases, a low-level system profiling tool can be used in order to profile the parameters required for calculating the WCET.

Figure 2:
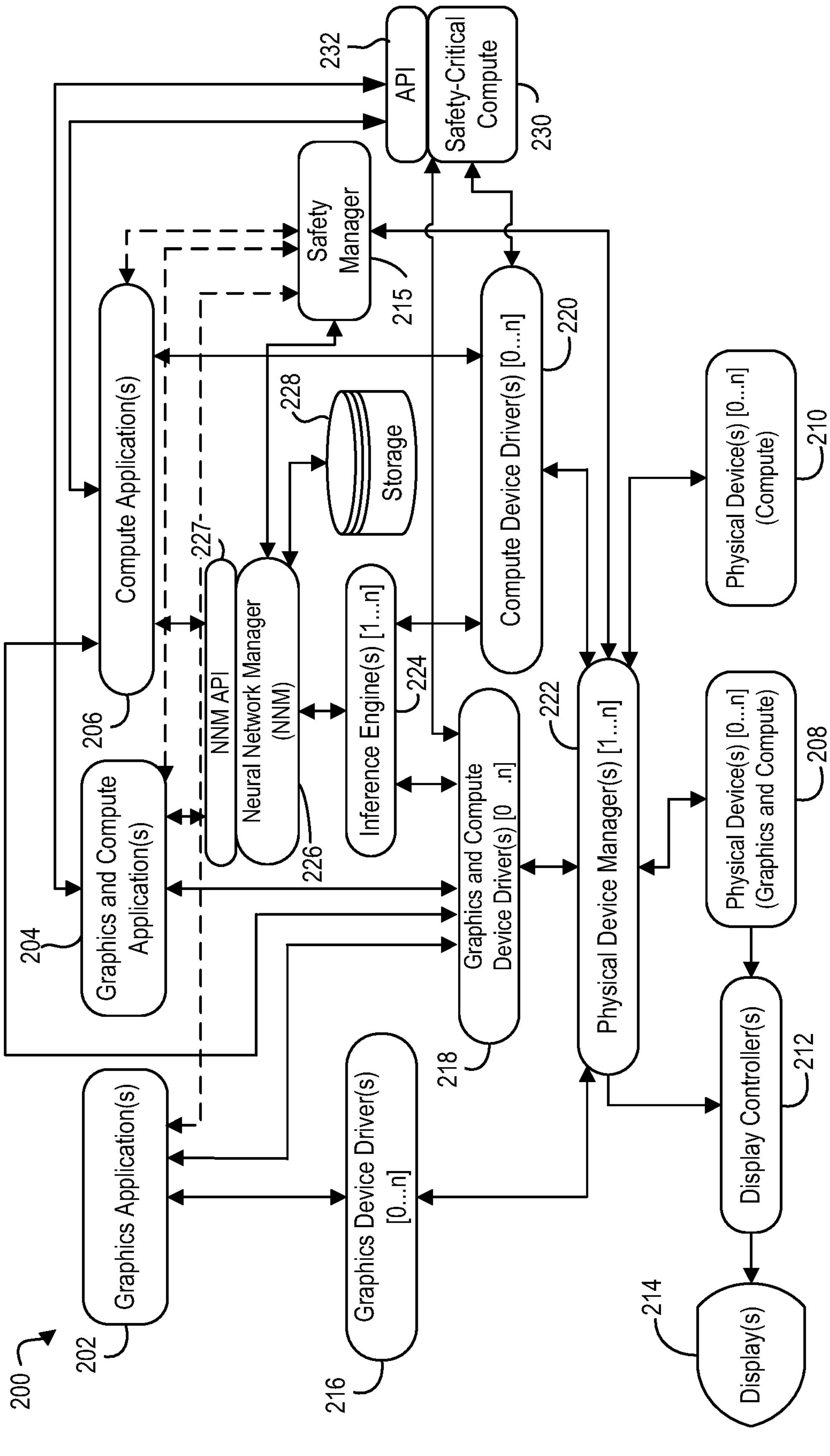
FIG. 2 is a software/hardware block diagram for a computing platform for deterministic workflow execution, according to some embodiments.

Referring now to FIG. 2, there is shown a software/hardware block diagram for an example computing platform 200 for providing a time- and space-bounded infrastructure for executing workloads, including neural-network based workloads. In at least one example application, the system 200 may allow executing of workloads in a safety-critical environment. In various cases, the computing platform 200 may be a single integrated platform. In other cases, the computing platform 200 may be a distributed platform. For example, part of the computing platform 200, such as one or more physical devices 208 or 210, may be located remotely and accessed via a network, as in a cloud-based arrangement.

As shown, system 200 generally includes one or more applications, which can include one or more graphics applications 202, graphics and compute applications 204, and/or compute applications 206 ("applications 202-206"). In some example cases, some or all of applications 202-206 may be safety-critical applications. In at least some embodiments, graphics application 204 and/or compute applications 206 may require processing data using neural network algorithms.

System 200 can also include one or more hardware devices to execute workloads generated by applications 202-206 (e.g., executing neural net-based workloads, as well as other data processing computations). In some cases, system 200 may have a heterogeneous system architecture, and may include physical devices having more than one type of processor and/or processing core with dissimilar instruction-set architectures (ISA). For example, in the illustrated embodiment, system 200 can include one or more graphics and computing physical devices 208, as well as one or more computing physical devices 210 ("physical devices 208, 210"). The physical devices 208, 210 may include various processing devices (e.g., CPUs, SPUs, etc.). In other embodiments, system 200 can have a homogeneous system architecture, and may include physical devices having a single type of processor and/or processing core.

In some embodiments, the system 200 can include graphics and computing physical devices 208 (e.g., GPU) which can generate image outputs. For instance, graphics and compute devices 208 can receive graphic data from a graphics application 202, and/or a graphics and compute application 204. The device 208 may then process the graphic data to generate image data. In at least some embodiments, the image data may be communicated to one or more display controllers 212, which convert the image data into a displayable form. The displayable image may then be communicated to one more displays 214 for display (e.g., a screen accessible to a user of system 200). Where system 200 performs safety-critical tasks, images generated by an application 202 or application 204 can include warning alerts/images to system users (e.g., a warning of imminent collision, or a detected threat). In other embodiments, the graphics and compute devices 208 can receive and process compute data from graphics and compute applications 204 and/or compute applications 206 (e.g., executing neural network algorithms, or FFT algorithms).

In some embodiments, the physical devices 208 or 210 may support workload priority requests and pre-emption. In particular, as explained in further detail herein, in cases where a physical device supports pre-emption, an application can request that all compute workloads being executed on the physical device 208 and/or 210 be stopped. For instance, as also explained herein, this may allow suspending or discarding execution of low priority workloads on the physical device in favor of executing high priority workloads.

One or more devices drivers 216, 218 and 220 is provided to interface applications 202-206 with physical devices 208 and 210. In the illustrated example embodiment, system 200 includes a graphics driver 216 for interfacing graphics application 202, a graphics and compute driver 218 for interfacing graphics and compute application 204 and a compute device driver 220 for interfacing compute application 206. In some embodiments, the graphics and compute driver 218 may also be used for interfacing compute application 206 with the graphics and compute device drivers 218 (e.g., the compute application 206 may use the compute portion of a graphics and compute device driver 218). Each device driver may include an API (e.g., OpenGL, Vulkan, DirectX, Metal, OpenCL, OpenCV, OpenVX and Compute Unified Device Architecture (CUDA)) to communicate with applications 202-206. In some cases, the compute platform may also include a compute library that implements compute algorithms with an API to interface with a safety-critical compute application.

One or more physical device managers (PDMs) 222 may be provided for managing communication between applications 202-206 and physical devices 208, 210, e.g., via device drivers 216-220.

More specifically, PDMs 222 are configured to receive workload requests from applications 202-206, e.g., via their respective driver, and to submit the workload to a physical device 208, 210 for execution. For example, PDMs 222 may receive requests to execute neural network-based workloads on physical devices 208, 210. Once a request has been submitted to a physical device 208, 210, the PDM 222 can clear the workload from the submit workload queue. In cases where physical devices 208, 210 support compute workload priorities, PDM 222 can also queue workloads of different priorities.

PDM 222 may also configure each physical device 208, 210 at start-up and specify which resources, in each physical device, are allocated to executing each application workload. For instance, where a physical device 208, 210 supports resource allocation/reservation and has sixteen compute units, the PDM 222 may assign six of the compute units to a first workload, and ten of the compute units to a second workload. In other cases, the PDM 222 may assign different numbers of compute queues in a physical device to process a first and a second workload. In other cases, PDM 222 may assign workloads to physical devices based on instructions received from an application 202-206, or the neural network manager 226.

In embodiments where a physical device 208, 210 supports pre-emption, the PDM 222 can also control the stopping of currently executing compute workloads, thereby allowing the PDM 222 to re-assign compute units (or compute queues) in physical devices 208, 210 to new workloads (e.g., high-priority workloads).

In some embodiments, system 200 may include one PDM 222 for each type of graphics and compute 208 or compute 210 hardware. Accordingly, each PDM 222 can manage one or more physical devices 208, 210 of the same type, or model. In other embodiments, one or more PDMs 222 can be used for managing dissimilar physical devices 208, 210.

In example applications where system 200 is used for executing neural network-based workloads, system 200 can include one or more inference engines (IEs) 224. Generally, inference engines 224 are programs or program threads which implement neural network operations to generate outputs. In particular, inference engines are modules that receive neural network model definitions, workloads and data, parse and interpret the model workload parameters, compile and/or generate a computation graph, and generate the processor commands (e.g., Vulkan commands) for implementing the model and workload, to generate an output when the processor commands are executed with workload data. While the inference engines 224 are illustrated as being separate from the NNM 226, it will be appreciated that in other embodiments, the NNM 226 may be configured to perform the functions of the inference engines 224.

In various embodiments, inference engines 224 may allow execution of neural network-based workloads, from applications 204, 206 on physical devices 208, 210. The inference engines 224 may interface with both applications 204, 206 (via a neural network manager 226), and compute enabled physical devices 208, 210, via their corresponding device drivers 216-220, and physical device managers (PDMs) 222.

In order to allow inference engines 224 to execute on physical devices 208, 210, inference engines can be allocated one or more compute resources in physical devices 208, 210. Compute resources in a physical device generally include hardware execution units, memory, execution cycles and other resources supporting allocations and reservations within a physical computing hardware device. In some cases, compute resource allocations can span multiple physical devices. For physical devices, that support compute resource reservation/assignments, resource allocations may be at a "fraction of a device" granularity (e.g., allocating or reallocating a subset of compute units or compute queues in a physical device). As explained in further detail herein, allocation of compute resources may be performed by a neural network manager 226, at the request of an application 204, 206, as well, in some cases, by the safety manager 215.

In some embodiments, an inference engine 224 may be allocated one or more "dedicated" compute resources. Accordingly, the "dedicated" resources are only available for executing their allocated inference engines 224, and further, are always available when required for executing the inference engine.

In other embodiments, one or more compute resources can be allocated to multiple inference engines 224 (e.g., multiple inference engines may share one or more compute resources). For example, a first inference engine (IE '1') and a second inference engine (IE '2') may have shared allocation of all compute resources available in a first GPU (GPU '1'). In these embodiments, only one inference engine 224 may be allowed to execute on a shared compute resource at a given time.

In still yet other embodiments, compute resources may not be assigned to specific inference engines. In these cases, the computer resources and inference engines may be considered to be "flexible". As explained in further detail herein, the neural network manager 226 may be responsible for assigning flexible inference engines to flexible compute resources.

In at least some embodiments, PDM 222 may be used to enforce the resource allocation for each inference engine 224. For example, in cases where a first inference engine 224 (i.e., IE '1') is allocated all compute resources available for a first GPU (i.e., GPU '1'), and a second and third inference engine (i.e., IE '2' and IE '3') are allocated shared use of resources available in a second GPU (i.e., GPU '2'), PDM 222 can enforce the resource allocations by disregarding compute resource requests for GPU '1' from IE '2' and IE '3'.

In some embodiments, PDM 222 may be also used to service workload requests from specific inference engines (IEs) 224. As explained herein, this can be useful in systems which support high and low priority workloads in order to service only high priority inference engines, while discarding low priority inference engines.

Referring still to FIG. 2, system 200 can also include a neural network manager (NMM) 226. NNM 226 allows applications 204-206 to load neural networks into system 200, and further, to execute workloads on neural-net based inference engines. In particular, as explained in further detail herein, NNM 226 allows system 200 to operate as a deterministic, time- and space-bounded system. Accordingly, in at least some embodiments, this can allow system 200 to effectively perform safety-critical tasks.

As shown, NNM 226 can include an NNM application program interface (API) 227. NNM API 227 interfaces with applications 204, 206 to receive neural networks, application workload requests, as well as other queries. In various cases, the NNM API 227 may be configured to load neural networks from applications 204, 206 using a standardized exchange format (e.g., Neural Network Exchange Format (NNEF) or Open Neural Network Exchange (ONNX) format). In other cases, NNM API 227 can also support other neural network formats, whether proprietary or open.

In some embodiments, NNM 226 can support caching of neural networks (e.g., in a transient memory), once loaded by the applications 204, 206. For example, NNM 226 can cache loaded neural networks into storage unit 228. Storage unit 228 may be a volatile memory, a non-volatile memory, a storage element, or any combination thereof. Accordingly, by caching neural networks, explicit re-loading of neural networks is not required to execute new workload requests from applications 204, 206 using previously loaded neural networks. Rather, applications 204, 206 can simply specify the cached neural network to the NNM 226, and the NNM 226 can swap-in and swap-out the relevant neural networks from storage 228. In various cases, the NNM 226 can also cache certain "configurations" (e.g., specific inference engine commands, and compute resource allocations, etc.).

NNM API 227 and NNM 226 also provide an infrastructure for allowing applications 204, 206 to control neural network execution and implementation. For example, in various cases, NNM API 227 can allow applications 204, 206 to generate and configure inference engines 224, and allocate specific neural networks to execute on specific inference engines 224. Applications can also allocate compute resources for executing different inference engines 224. For instance, applications can dedicate specific compute resources for specific inference engines 224, or otherwise, may allocate a group of compute resources to execute multiple inference engines. In various cases, NNM 226 may communicate the workload and resource allocations to the physical device manager (PDM) 222, which may implement the requested resource allocations. As explained in further detail herein, in some cases, the NNM 226 can communicate workload and resource allocation via a safety manager 215.

In some embodiments, to allow applications 204, 206 to make informed determinations with respect to allocating workloads and compute resources, NNM API 227 may allow applications 204, 206 to query the compute capabilities of the system. For example, NNM 226 can monitor parameters of the system 200, and can provide applications 204, 206 with information about: (i) the number and types of physical devices 208, 210 in system 200; (ii) the compute capabilities of each device 208, 210; (iii) other properties and characteristics of the system 200 and physical devices 208, 210, including whether a physical device supports computer resource reservation/allocation; (iv) information about which inference engines (IEs) have been created; (v) which neural networks (NNs) have been allocated to which inference engines (IEs); (vi) which compute resources have been allocated to which inference engines (IEs); and (viii) statistical information about inference engine (IE) execution (e.g., the number of times an inference engine has taken longer to execute than expected). In some embodiments, this information may be provided by NNM 226 only after receiving a query request from an application 204, 206. In other embodiments, the NNM 226 may provide this information automatically to applications 204, 206 (e.g., continuously, at periodic time intervals or pre-defined time frequencies).

NNM 226 can also receive workload requests from applications 204, 206. For example, an application can submit a workload for execution using a pre-loaded neural network. Accordingly, in these cases, the NNM 226 can execute the requested workload using the inference engine allocated to executing the application's neural network. In various cases, to execute workloads on inference engines, NNM 226 can include a resource scheduler which manages scheduled execution of inference engine workloads on their allocated compute resources. The NNM's resource scheduler plays an important role in ensuring timely and orderly execution of different neural net-based inference engines.

In cases where inference engines 224 have been designated, by applications 204, 206, to specific compute resources, the NNM scheduler can simply enqueue the workloads into the inference engine's 224 workload queue. The PDM 222 may then allow the inference engine 224 to execute on its designated compute resource. In some cases, applications 204, 206 can either block waiting for the compute result from the inference engine 224, or otherwise, await notification when the compute result is available. In some embodiments, notifications can occur in the form of a callback, or interrupt to the application.

In cases where inference engines 224 are allocated shared computing resources, the NMM 226 can again enqueue compute workloads into the inference engine's workload queue. In some embodiments, the NNM scheduler can determine execution order of inference engine workloads on shared resources before enqueueing the workload into an inference engine's queue. In other embodiments, the inference engine 224 can notify the NNM's shared resource scheduler to request scheduled execution on the shared resource. In either case, the NNM scheduler may schedule the inference engine workloads such that only one inference engine is utilizing a shared compute resource at a time.

In embodiments where the NNM 226 receives multiple workload requests for inference engines having shared resources, the NNM scheduler may execute the workloads either "in-order" (e.g., sequentially, in the order the workload requests are received), or "out-of-order". In some cases, "out-of-order" execution may be performed to balance compute resource allocations between different inference engines. For instance, if requests to execute a workload on an inference engine 224, with less demanding compute resource requirements, can be scheduled concurrently ahead of workload requests for inference engines 224 with more demanding compute resources, the resource schedule can execute the inference engines "out-of-order". For instance, a resource scheduler can receive workload request from a first inference engine (IE '1'), a second inference (IE '2'), and a third inference (IE '3'). The IE '1' may have shared allocation between a first GPU (GPU '1') and a second GPU (GPU '2'), IE '2' may have shared allocation of GPU '1', and IE '3' may have shared allocation of GPU '2'. In this case, the scheduler may execute IE '2' and IE '3' in parallel before serving the request from IE '1'. In another example case, a scheduler may manage ten compute resources, and may receive, in order, seven compute resource requests from IE '1', four compute resource requests from IE '2', three compute resource requests from IE '3'. In this case, the resource scheduler may also execute IE C. and IE '3' in parallel, before serving the request from IE '2'.

In cases where an inference engine 224 is configured with flexible compute resources (e.g., no compute resources are designated to execute the inference engine's workload), the NMM 226 can enqueue the compute workload into the inference engine 224. As stated previously, in some embodiments, the NNM scheduler can determine execution order of inference engine workloads on flexible resources (e.g., non-designated compute resources). Before enqueueing the workload into an inference engine's queue. In other embodiments, the inference engine 224 can notify the NNM's resource scheduler to request execution on flexible compute resources. In either cases, the NNM 226 may then utilize various methods for scheduling execution of an inference engine on a flexible compute resource. For example, the NNM 226 can consider which resources are available, or otherwise track execution and heuristics of different inference engines to infer the compute resource requirement of a specific inference engine, and accordingly, allocate appropriate flexible resources.

In various cases, the NNM 226 may also allocate flexible resources based on information received from a requesting application. For instance, as explained herein, applications may, in some cases, specify a priority level for a neural network, as well as a "Healthy Case Execution Time" (HCET) (e.g., a time allocated for a neural network within with which a response must be returned for the execution of that neural network to be considered "healthy). Accordingly, the NNM 226 may allocate flexible resource to accommodate a neural network priority and/or an HCET. For example, greater flexible compute resources can be allocated for workloads having a higher priority or a shorter HCET. In other cases, applications 204, 206 may request execution of high priority neural networks to inference engine's 224 using dedicated compute resources, and low priority neural networks to inference engines allocated to shared or flexible compute resources.

In still other cases, specific physical compute hardware may be more suited for executing specific types of neural networks. Accordingly, an NNM may allocate inference engines to flexible compute resource based on the best suited compute resources for that particular inference engine.

In at least some embodiments, there may be overlap between flexible compute resources and shared compute resources. Further, some NNM implementations may allow mixed resource assignment. For example, an NNM 226 may require a minimum dedicated amount of compute resources, with an optional amount of flexible resources, to improve performance when flexible resources are available.

As part of providing a deterministic system, NNM API 227 can also allow applications 204, 206 to specify a "Healthy Case Execution Time" (HCET) for executing neural-net based inference engine workloads.

An HCET refers to a time allocated for a specific neural network to return a response in order for execution of that neural network to be considered "healthy". If a response is not received within the HCET timeframe, the neural network may be determined as being in an "unhealthy" state. In various cases, the "health state" of a neural network can be transient. For example, a neural network which is in, one iteration, in an "unhealthy state" may then execute, in a subsequent iteration, within the required HCET to return to a "healthy state".

Significantly, the concept of HCETs can be used to enforce inference engines completing execution within an expected timeframe. HCETs find particular importance in safety-critical applications, so as to ensure that all computations are executed in a deterministic, and time and space bounded manner, especially in applications where system 200 is scaled to large and complex models.

Figure 3:
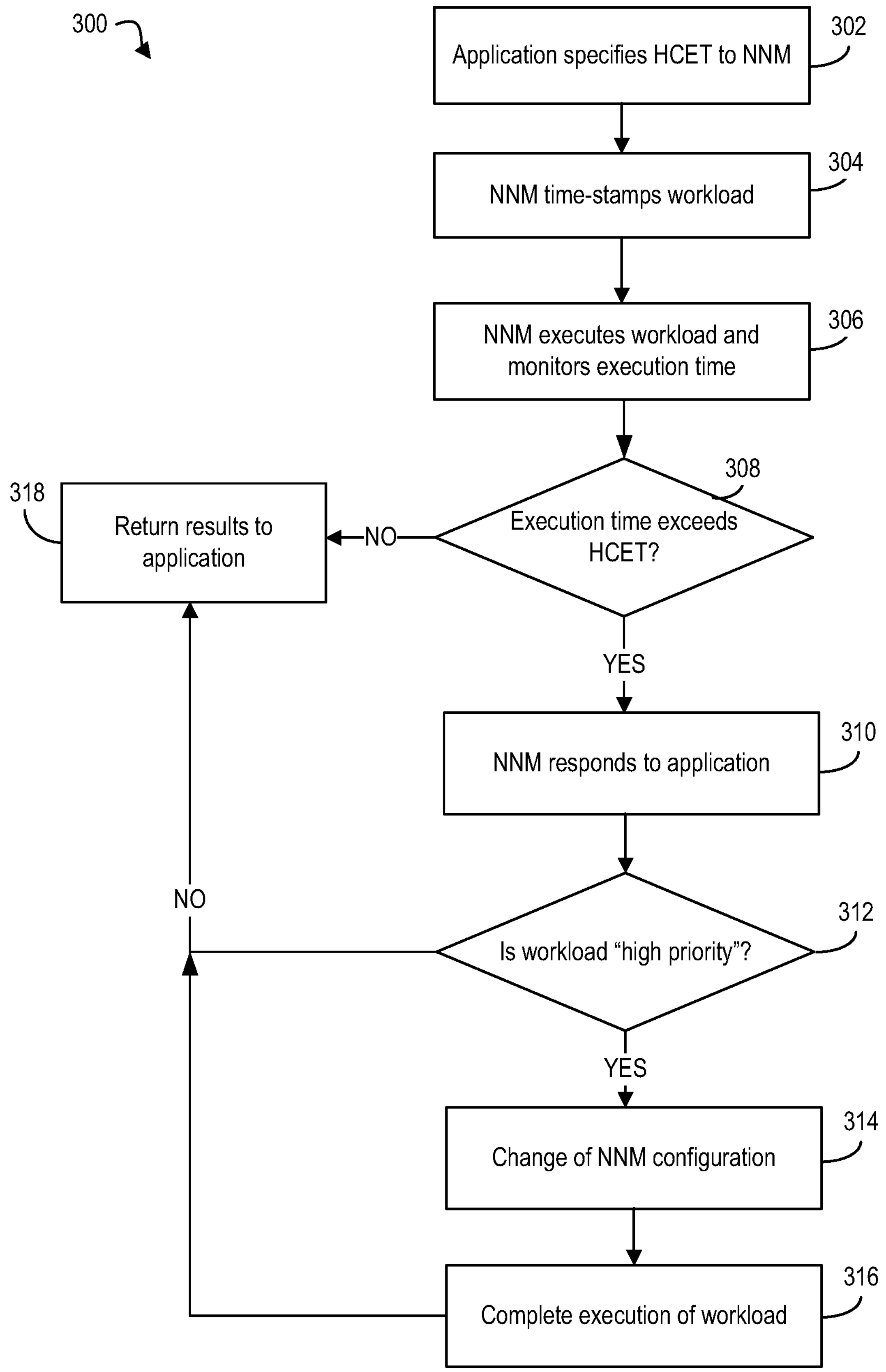
FIG. 3 is an example process flow for a method for using Healthy Case Execution Times (HCETs) to monitor the performance of neural-net based inference engines.

Referring now briefly to FIG. 3, there is shown an example process flow for a method 300 for using HCETs to monitor the execution of workflows (e.g., neural-net based inference engines).

At 302, an application 204, 206 can submit a workload to NNM 226 for execution (e.g., by an inference engine). The application 204, 206 may also specify an HCET for executing the workload (e.g., executing the inference engine), as well as specifying how to manage compute results after the HCET has been exceeded.

At 304, the NNM 226 can timestamp the workload request, which is received from the application 204, 206 at 302.

At 306, the NNM 226 can execute the workload by, for example, enqueuing the workload to an inference engine 224 designated by the application. The NNM 226 may then monitor the execution time of the inference engine, or otherwise, execution time of the workload by a processor.

At 308, the NNM 226 can determine whether the execution time has exceeded the HCET specified at 302. For example, NNM 226 can determine whether the time difference between the current lapsed execution time, and the time stamp generated at 304, has exceeded the HCET. In some cases, NNM 226 may periodically monitor execution time, until either the HCET is exceed or the workload is completed, whichever occurs first.

At 310, if the HCET has been exceeded at 308, NNM 226 can respond to the application, regardless of whether the compute workload has completed. If the application is "blocking" (e.g., the inference engine allocated to the application is failing to complete execution within the time budget, and therefore is not available for use by other applications), the NNM 226 can return an error code indicating that the HCET has been exceeded. In other cases, if the application is awaiting a "notification", the NNM 26 can notify the application with an error code indicating that the HCET has been exceeded. In either case, if the application has specified to receive compute results after the HCET has been exceeded, the NNM 226 can notify the application if (and when) the results become available.

At 312, the NNM 226 can determine whether the workload is a high priority workload. A high priority workload is a workload that requires execution in an immediate, or time-limited manner. For example, a high priority workload can correspond to a safety-critical task that requires immediate execution. In these cases, the high priority task requires completion to avoid potential unintended and/or hazardous consequences (e.g., a collision of an autonomous vehicle).

In some cases, the workload priority can be specified by the application to the NNM 226. For example, the application can specify the priority at the time of submitting the workload to the NNM 226. In other cases, at 312, the NNM 226 may query the application for the workload priority, and await a response back from the application. In still other cases, the NNM may be pre-configured to determine the workload priority based one or more features of the workload (e.g., the workload type, inference engine configuration, etc.)

At 314, if the workload is determined to be high priority, and the workload is exceeding its HCET, the NNM 226 may support a change to its "configuration profile". As explained herein, a change to the NNM's "configuration profile" can be used ensure that high-priority workloads are processed more promptly.

In general, a "configuration profile" is a configured state of the NNM 226 which can be applied at run-time. In various cases, the NNM 226 may have more than one configurable profile.

In some example cases, the NNM 226 may be configurable between a "Normal Execution Profile" and a "High Priority Execution Profile". In a normal state of operation, the NNM 226 may be configured in the "Normal Execution Profile". The "Normal Execution Profile" may be applied to the NNM 226 when all high-priority workloads (e.g., high-priority neural networks (NNs)) are executing within their HCETs. In other cases, NMM 226 can be re-configured to a "High Priority Execution Profile". A "High Priority Execution Profile" can be used when one or more workloads (e.g., neural net-based inference engines) is executing outside of its specified HCET (e.g., inference engines are operating in an "unhealthy state").

Accordingly, at 314, if a high-priority workload is executing outside of its HCET, an application can request the NNM 226 change its profile from a "Normal Execution Profile" to a "High Priority Execution Profile". In other cases, the NNM 226 may automatically re-configure itself from a "Normal Execution Profile" to a "High Priority Execution Profile".

In a "High Priority Execution Profile", the NNM 226 can increase the compute resource allocation for the high priority workload (e.g., high priority inference engine), while reducing or eliminating compute resource allocations for lower priority workloads (e.g., lower priority inference engines). In still other cases, the NNM may stop accepting low-priority requests from applications. In this manner, computing resources are not utilized to execute low-priority requests to the detriment of high-priority requests. In still yet other further cases, the NNM 226 can also reduce resource allocations in selected processing devices (e.g., CPU or SPUs, etc.) to allocate more compute resources in the processing device for processing the high priority workloads. In some embodiments, when switching profiles, any in-progress compute workloads may be discarded, and if supported by physical devices, the workloads can be "preempted" (e.g., NNM 226 can stop all compute workloads being executed on a physical device to accommodate the high-priority workload). In this manner, the application can then submit new compute requests corresponding to the high priority workloads.

In some embodiments, in cases of neural network-based workloads, changing from a "Normal Execution Profile" to a "High Execution Profile" can also adjust the processing abilities of an inference engine.

For example, in at least some embodiments, changing from a "Normal Execution Profile" to "High Execution Profile" may cause low-priority inference engines to process every $n^{th}$ request from an application, rather than every request. Accordingly, this can ensure that low priority inference engines are not consuming excessive computing resources to the determent of high priority inference engines. The same methodology can be used to process generic, non-neural net-based workloads from applications as well.

In other cases, a change from a "Normal Execution Profile" to "High Execution Profile" may cause execution (e.g., by a high priority inference engine) of a group of requests from an application, rather than executing each request from an application, individually. Accordingly, the high priority workloads can execute application requests more quickly.

Figure 4:
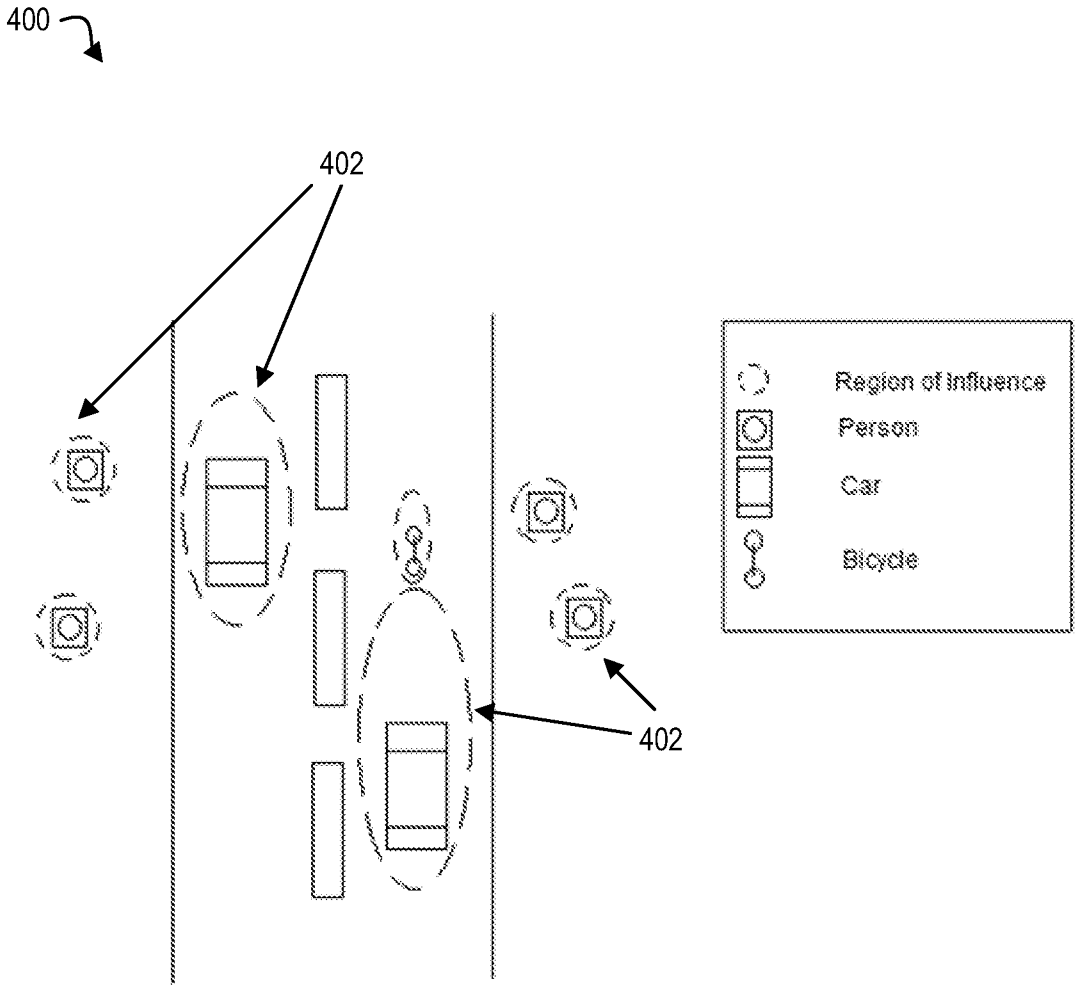
FIG. 4 is an example schematic diagram visualizing object recognition by an object recognition application.

Referring now briefly to FIG. 4, there is shown an example schematic diagram visualizing object recognition by an autonomous vehicle using neural-net based inference engines.

In particular, in a "Normal Execution Profile", the neural-net based inference engine can process data to identify, and recognize, objects in the surrounding environment. In this case, the inference engine can analyze each image frame, received from an object recognition application, to identify each object in the image. For example, this feature can be used in a collision avoidance system to prevent collisions between the autonomous vehicle and surrounding objects.

As shown in FIG. 4, in cases where execution of the inference engine is exceeding the HCET, an application can request NNM 226 to re-configure to a "High Priority Execution Profile". In this configuration, the inference engine analyzes groups of image frames (e.g., in parallel), rather than analyzing each image frame, individually. Accordingly, this can increase the processing speed of the inference engine to ensure that the inference engine executes more promptly.

In various cases, where the inference engine is analyzing "groups of images", the inference engine can generate "regions of influence" 402 around each object, rather than specifically identifying each object. The regions of influence 402 may be elliptical (in two dimensions) or ellipsoidal (in three dimensions), for example, though other shapes may be also be used. Accordingly, the "regions of influence" can provide a more general method for avoiding collision that is less computationally intensive than identifying individual objects (e.g., as would occur in a "Normal Execution Profile"). The use of "influence regions" can provide a fall back to preventing collisions if the inference engine is unable to identify each object within the HCET.

Analyzing groups of images in a "High Execution Profile" can also allow the inference engine to determine risk of collision by analyzing the evolution of the environment, over time, through analyzing multiple images. In some embodiments, the selected region of influence for each object may be determined based in part on analysis of multiple images. For example, an elongated ellipsoid may be used for a fast-moving object such as a vehicle, with the longitudinal axis of the ellipsoid oriented along the direction of travel of the vehicle. Conversely, a sphere may be used for a slow-moving object such as a human, in which case the sphere may be centered on the human, indicating that the human's direction of travel is less certain.

In some cases, this can allow the inference engine to estimate potential paths of surrounding objects. For example, the inference engine can generate confidence levels based on object movement history, object type (e.g., a person may only move [x] distance within [y] timeframe when on foot), as well as other factors. The inference engine can then quantify the severity risk of projected scenarios and probabilities. If a risk of collision is high, the application can take a high-risk response (e.g., apply brakes immediately). Otherwise, if risk of collision is low, the vehicle can proceed with expectation that the NNM will revert back to a "Normal Execution Profile". In other cases, weights can also be allocated to different objects to help determine an appropriate response action (e.g., a dog may be assigned a lower weight than a person, etc.).

In some cases, inference engines can also be dedicated to analyzing image groups under a "Normal Execution Profile". Accordingly, this may allow system 200 to analyze patterns in the environment, and to estimate potential paths of surrounding environments, without resorting to operating in a "High Execution Profile" mode.

In some cases, the "High Execution Profile" can also reduce the execution time of workloads (i.e., high priority inference engines) (e.g., which are exceeding their HCET) by distributing the execution of the workload between two different queues associated with a physical device. For example, rather than a single queue being used to analyze each image frame, two or more queues in a physical device can be used for analyzing alternating images frames in order to detect objects. Accordingly, this can reduce the computational load for an under-performing inference engine. In still other cases, in a "High Execution Profile" mode, the high priority inference engine can be made to execute faster by utilizing greater compute resources. For example, rather than executing application requests using only a single processing device (e.g., GPU), a high priority inference engine can execute a single request across two or more processing devices. In various cases, more than one method (e.g., distributing workload among one or more queues, increasing compute resources, analyzing groups of requests in parallel) can be used concurrently to increase the processing speed of a high-priority inference engine in a "High Execution Profile".

Referring now back to FIG. 3, when an application requests a configuration profiled be applied to NNM 226, the application can also specify if the physical devices, inference engines, and neural networks configurations that are unchanged from the current profile state, to the new profile state, should have their states re-applied. For example, in some instances, when changing a configuration profile, it may be desirable to re-apply the state and terminate any in-progress workloads. This can allow the system to be completely set-up for new workloads. In other cases, it may be desirable to only modify changing states, and continue in-progress workloads unaffected by the state changes. In some embodiments, not all NNM 226 implementations and profile changes may support re-applying states.

In some cases, configurations of the neural networks, inference engines and configuration profiles may be done once during the system initialization phase. This can be done, for example, by a configuration file, a single application configuring all neural networks and inference engines, or multiple applications all configuring the neural networks and inference engines they will utilize independently. Following the initialization phase, some NNM implementations may enter a runtime phase where they reject any subsequent configuration requests (except for switching configuration profiles).

At 316, the workload can complete execution. In various cases, at 316, once the workload has completed execution, the NNM 226 profile can return to a "Normal Execution Profile".

At 318, the NNM 226 can return the results of the executed workload back to the application.

In cases, where the execution time has not exceeded the HCET at 308, or the workload is deemed not be a "high priority" workload at 312, the execution of the workload may be completed as normal and the results returned to the application at 318.

While the NNM 226 profile configuration has been explained herein in relation to a "Normal Execution Profile" and a "High Execution Profile", it will be appreciated that, in other embodiments, the NNM 226 may be configurable to implement other profiles to respond to HCET violations.

In various embodiments, the determination of the HCET for an inference engine may be determined based on predicting the "Worst Case Execution Time" (WCET) for executing the workload. For example, a WCET can be the maximum timeframe required for a neural net-based inference engine to complete execution.

The determination of the WCET requires may be determined in cases where commands in a queue are executed by a CPU and/or SPU "in-order", and in cases where commands are executed "out-of-order".

In cases where commands are executed "in-order", the calculation of the WCET in a heterogeneous system depends on the time critical component.

In embodiments where the CPU is the time critical component, the WCET calculation can disregard the time required for other processing devices (e.g., SPUs) to complete their portion of the calculation. In particular, the execution time for tasks executed in other processing devices are important only if they impact the CPU. An example application where the CPU may be the time-critical component is where the CPU manages the brake system in a semi-autonomous car, while the SPU manages data processing for speech recognition.

In other embodiments, all processing devices may be time-critical components (e.g., CPU and/or SPU). In these cases, the time spent by non-CPU processing devices completing a task may directly impact the processing time for the CPU.

Accordingly, the WCET calculation requires predicting the time required for the CPU and other processing devices (e.g., SPUs) to complete a computation task. An example application where the CPU and SPU are time-critical may be where the CPU manages sensory data from a car's camera network, offloading the data to the SPU for processing, and waiting for the result of the data processing for further action.

In still other embodiments, only the non-CPU processing devices (e.g., SPU) may be the time-critical components.

Figure 5A:
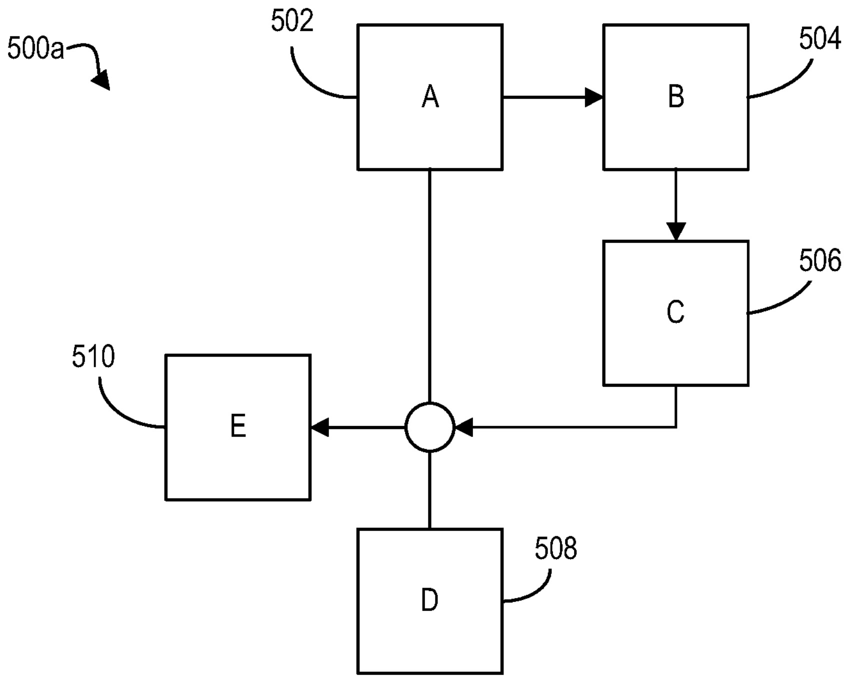
FIGS. 5A and 5B show example block diagrams illustrating a scenario where a CPU is a time-critical component.
Figure 5B:
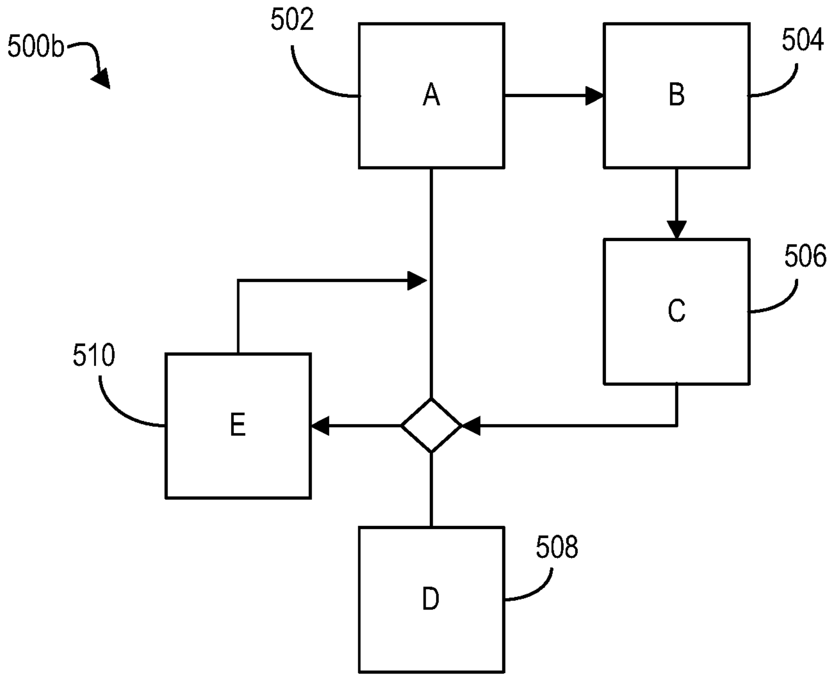

Referring now briefly to FIGS. 5A and 5B, there is shown example block diagrams 500A and 500B illustrating a scenario where the CPU is the time-critical component. In particular, in this this example embodiment, and in the following discussion, references to the GPU have only been provided herein by way of an example case of an SPU, and it will be appreciated that the same concepts, provided herein, may apply to other types of SPUs.

As shown, tasks A-E are provided for execution on various processing devices. In this example case, task "A" 502 and task "E" 510 are executed on the CPU, while tasks "B" 504 and task "C" 506 are executed on the GPU. To perform task "A" 502, the CPU first requires launching task "B" 504 and task "C" 506 on the GPU. In this example, task "D" 508 is not time-critical, and depends on the results of task "B" 504 and task "C" 506, while task "E" 510 is a time-critical task.

In an example case where the GPU is modifying a data buffer that the CPU requires to perform task "D" 508, if the CPU is the only time critical component in the system, then task "D" 508 is not one of the time critical tasks the CPU is handling since it depends on the GPU.

In this example case, in a normal course of operation, the GPU processing is not expected to bear on a WCET calculation, as the GPU is not time-critical. In other words, the WCET may be determined based primarily or even solely on the CPU.

FIG. 5A, however, demonstrates an example where poor implementation of an application can otherwise result in the GPU affecting the WCET calculation. In particular, in the example of FIG. 5A, the application calls to read a region of the buffer, and a blocking call parameter in OpenCL (i.e., Open Compute Language) is set to "TRUE". In other words, the blocking call parameter is set such that the CPU cannot proceed to processing task "E" 510 until task "B" 504 and task "C" 506 are completed by the GPU. Accordingly, while the processing of task "E" 510 is not otherwise contingent on completions of tasks "B" and "C", poor application design results in the CPU depending on the GPU for completing tasks "B" and "C". As such, in this example case, the CPU's execution time for processing task "E" requires determining the WCET for executing tasks "B" and "C" on the GPU (e.g., poor application design has resulted in both the CPU and GPU being unnecessarily regarded as time-critical).

In contrast, FIG. 5B shows an example case where the blocking parameter for a read buffer is set to "FALSE". In this case, the CPU may proceed to executing task "E" 510 without waiting completion of tasks "B" and "C" by the GPU. In particular the CPU can use an event enqueued at task "C", check its status, even if the task has not completed, then the CPU can perform time-critical task "E", then go back to check on the status of the event. Once the GPU indicates that task "C" is complete, the CPU can proceed to perform task "D" 508. Accordingly, in this case, the CPU's execution time is deterministic to the time critical task "E".

Accordingly, in the case of FIG. 5B, the GPU synchronization points are irrelevant to the issue of determinism. In particular, this is because the only component that has to execute in a deterministic manner is the CPU, and the CPU does not have to issue a "blocking call" to wait for the GPU to complete execution of its task functions. Accordingly, in this example, the WCET calculation is influenced based on the CPU's execution time.

In cases where tasks executing on the GPU are also time critical (e.g., FIG. 5A), the WCET should be calculated for both the GPU and the CPU to ensure that the CPU has enough time to handle the response from the GPU.

In various cases, calculating the WCET for a CPU may simply involve accounting for a scheduling algorithm which is selected in a Real Time Operating System (RTOS), the CPU's frequency, the disassembling code (e.g., C code), tracing assembly code, and considering the worst path in the CPU. Calculating the WCET for a GPU where the GPU is time-critical may be determined according Equation (1), which expresses the general case for calculating the WCET with any number of kernel instructions and workgroups.

$$WCET_{kernel} = \sum_{i=0}^{i=n}\left(\sum_{j=0}^{j=p} T_{genOp}(j) + \sum_{k=0}^{k=q} T_{mem}(k) + T_{schWg}(i) + T_{lag}(i)\right) \quad (1)$$

wherein "i" denotes the number of workgroups; "j" defines the number of generic operations; "k" defines the number of fetch/store operations. Further, $T_{genOp}$(j) defines the time to execute a math operation, or generic operation, that can be calculated as constant (e.g., using the number of cycles to execute the instruction); $T_{mem}$(k) defines the time to execute an instructions that relates to external memory (e.g., image fetches, data fetches, image writes, or data writes). In various cases, $T_{mem}$(k) is influenced by the location of the memory, as well as other latencies. $T_{schWg}$(i) is the time a specific workgroup has waited for a compute unit (CU) (e.g., to get a CU, or to get it back if switched out by a scheduler). $T_{lag}$(i) defines the time lag between the first and last thread of the CU. In particular, $T_{lag}$(i) is GPU specific and changes based on the inherent variance in execution between the first and last thread of a CU, as well as by the number of barriers placed in the kernel.

Equation (2) expresses a simpler case involving a single kernel with a single math instruction, executing a single workgroup:

$$WCET_{kernel}=T_{genOp}+T_{mem}+T_{schWg}+T_{lag} \quad (2)$$

In various cases, the "Worst Case Execution Time" (WCET) can be considered as a superset of the "Best Case Execution Time" (BCET). The "Best Case Execution Time" (BCET) can be expressed according to Equation (3):

$$BCET_{kernel}=T_{genOp}+T_{mem} \quad (3)$$

In the BCET, $T_{schWg}$ (e.g., time waiting for CU) and $T_{lag}$ (e.g., time lag between first and last threads) approach zero.

In cases where threads in the GPUs execute in lock step, $T_{lag}$ is consistently zero, with the exception of kernels that contain instructions that specifically serialize the execution of individual threads (e.g., atomic operations). In these cases, the atomic operations may cause the threads to break out of sync until a barrier is reached.

For architectures where the GPU executes in lock step, the only impact to the execution time variance is affected by kernels which serialize operations, or have operations which introduce inter-thread dependency. In various cases, where the kernels serialize operations, the $T_{lag}$ can be estimated by measuring multiple runs of the same kernel, and performing statistical analysis on the profiling data. In other cases, the amount of time threads are allowed to deviate from each other, where the kernel serializes operations, may be a bound quantity (e.g., specified by a device manufacturer). In any case, the time variations are typically confined to events happening within a workgroup, rather than by external events.

In cases where the GPU threads do not execute in locks steps, and threads drift within the CU, $T_{lag}$ is affected by the innate time variance between threads within a CU, by barrier calls, as well as by instructions interacting with shared hardware resources which may influence the way individual threads drift from each other. However, most GPU architectures do not operate with drifting threads, but operate in lock step.

$T_{schWg}$ is a poorly deterministic variable in Equation (2). In general, $T_{schWg}$ is affected by the GPU's scheduler, and is also influenced by the extent of business of the GPU at a given point in time. For example, if the GPU is processing graphics commands as well as compute commands, the graphics commands may impact the time it takes to schedule a workgroup. In general, because of the number of factors that can effect $T_{schWg}$ (e.g., inside and outside of the workgroup), workloads that require deterministic WCET calculations may need to minimize the contribution of $T_{schWg}$. In some cases, the contribution of $T_{schWg}$ can be minimized by ensuring that the GPU is reserved specifically for compute workloads while a time-critical kernel is executed. Further, minimizing the number of workgroup and workgroup sizes can reduce the $T_{schWg}$ as $T_{schWg}$ is proportional to the number of workgroups that need to be scheduled.

In at least some embodiments, the GPU scheduler may be configurable to operate between a "non-safety critical" scheduling mode (also referred to herein as a non-deterministic scheduling mode) and a "safety-critical" scheduling mode (also referred to herein as a deterministic scheduling mode). In various cases, an application (e.g., 202-206) may be operable to vary the GPU mode (directly, or otherwise via the NNM 226, the physical device manager 222, or other components of the system 200) between the "non-safety critical" scheduling mode and the "safety-critical" scheduling mode. In at least some embodiments, the "non-safety critical" mode can offer faster, but less deterministic execution, while the "safety-critical" mode can offer slower, but higher deterministic execution. Accordingly, based on the desired performance, the appropriate scheduling mode can be selected, i.e., by an application.

In some embodiments, in the "non-safety critical" mode, the scheduler may receive compute requests, and the scheduler may determine available compute units to allocate for each workload (e.g., a shader program). If the scheduler determines that specific workload instructions are taking "too long" to execute (e.g., due to a memory fetch operation)—or otherwise that a particular pre-defined execution event is occurring and/or is taking longer than expected to complete—the scheduler may halt execution of the workload (e.g., cache the current execution state), and allocate the compute units to another workload. The scheduler may then allow the new workload to execute for a duration of time. In particular, this may provide enough time for the execution event (e.g., memory fetch operation) of the original workload to complete. Once the sufficient time has elapsed to complete the execution event, the GPU scheduler can halt execution of the new workload (e.g., cache the new workload's current execution state), and re-allocate the computing units back to the previously halted workload in order to complete its execution i.e., using the cached execution state. In other cases, the GPU scheduler can wait until the new workload is completed execution, before returning to executing the original workload. In other cases, after allocating the compute units to the new workload, the GPU scheduler can terminate the initial workload based on instructions from the application, rather than caching the execution state. In still other cases, after allocating the compute units to the new workload, the GPU scheduler may intermittently check that the execution event—that triggered the re-allocation of compute units—is complete, and once the event is determined to be complete, the GPU scheduler may allocate compute units back to the previously halted workload.

In some embodiments, the application may determine whether the GPU's scheduler operates in a safety-critical or non safety-critical mode. For example, in some cases, the scheduler may initially operate in a non-safety-critical mode to execute an initial (e.g., previous) workload request, and the application may submit a safety-critical workload request along with instructions for the GPU scheduler to revert to a safety-critical mode. To this end, the application may—more particularly—instruct the scheduler to cache an execution state associated with its current workload request being executed in the non safety-critical mode, revert to a safety-critical mode to execute the application's new workload request, and upon completion of execution, revert back to the non safety-critical mode to complete the initial workload request based on the cached execution state. In other cases, the application may instruct the scheduler to terminate execution of a current workload executing in the non safety-critical mode, revert operation to a safety-critical mode to execute the new workload request, and upon completion of execution, revert to the non safety-critical mode to receive new requests. In still other cases, the application may instruct the GPU scheduler to permanently revert from a non safety-critical mode to a safety critical mode (or vice versa) to execute the new workload request, and any other further requests, subject to further instructions from the application (or other applications).

"Non-safety critical" schedulers, however, are optimized for performance over safety. For example, the scheduler is not deterministic, and its operation parameters are undocumented (e.g., the longest time a workload can be expected to be halted is an undocumented parameter in most conventional GPU schedulers). Accordingly, this may result in $T_{schWg}$ being a poorly deterministic variable for calculating the WCET of the GPU.

Accordingly, to compensate for the deficiencies of the "non-safety critical" operations, the GPU scheduler can operate in a "safety-critical" scheduling mode, in which the scheduler is deterministic and all scheduling parameters (e.g., priorities, whether or not a workload can be halted and swapped, the length of time a workload may be halted, time duration between workload arrival and compute unit scheduling, etc.) are documented. In particular, all scheduling parameters are recorded and made available to a GPU driver. Accordingly, the $T_{schWg}$ may be a highly deterministic variable, which facilitates WCET calculations for the GPU.

In various cases, a driver for the GPU may determine, at run time, whether or not to set the scheduling mode to "safety critical" or "non-safety critical", depending on the type of work being executed by the GPU. $T_{genOp}$ is a highly deterministic component of Equation (2). Generic operations encompass most instruction set architecture (ISA) instructions where the number of cycles to execute the instructions is knowable for a GPU (e.g., based on manufacturer documentation).

$T_{mem}$ is a poorly deterministic variable in Equation (2). In various cases, $T_{mem}$ impacts $T_{schWg}$, as waiting on a data fetch/store can cause a working group (WG) to be switched out of the CU. Further, it is unlikely that $T_{mem}$ approaches zero, for any mostly workloads. In particular, workloads usually operate on data requires a fetch/store data from the memory. The time required to perform this operation depends on the latencies related to where the data is stored, as well as how many "actors" are operating the same memory. For example, in cases were a graphics process is reading data from the VRAM, the display controller is reading data from the VRAM, and the compute device is reading data from the VRAM, there can be contention and latencies given the limited bandwidth of the database. In various cases, the latency to retrieve the data will depend on the load on the memory at a particular time, which can be difficult to determine in complex systems with multiple running processes.

In various cases, to minimize the non-deterministic effect of $T_{mem}$, the data accessed by the GPU can reside in a memory that is as close as possible to the GPU. For instance, in some cases, using a VRAM instead of a main memory for a discrete GPU (e.g., dGPU) can eliminate the need for using a peripheral component interconnect express (PCIE) between the memory and the GPU. In other cases, minimizing the effect of $T_{mem}$ is accomplished by ensuring that no other work is occurring on the GPU while the time-critical work is taking place, as well as removing other components using the same memory type (e.g., a display controller). In various cases, removing these aggravating factors can assist in approximating $T_{mem}$ and determining the WCET for the GPU. In some cases, once the aggravating factors are removed, $T_{mem}$ can be approximated by running the same workload many times under different operating conditions and performing a statistical analysis on the data.

In view of the foregoing, in circumstances where the poorly deterministic components of Equation (2) are mitigated (e.g., $T_{mem}$ and $T_{schWg}$), Equation (2) can be re-expressed according to Equation (4):

$$WCET_{kernel} = C + \sum_{i=0}^{i=n}\left(\sum_{k=0}^{k=q}\left(T_{mem}(k) + T_{schWg}(i)\right)\right) \tag{4}$$

wherein "C" is a constant accounting for the deterministic part of the general equation, in Equation (2) (e.g., $T_{genOp}$ and $T_{lag}$).

While Equations (4) accounts for a case where a single kernel is running on a compute device, in many cases, a task may be broken down into a number of kernels, each contributing a piece of the result. Accordingly, for multiple kernels, $WCET_{task}$ can be determined according to Equation (5):

$$WCET_{task} = \sum_{i=0}^{i=n}\left(WCET_{kernel}\right) \tag{5}$$

Generally, Equation (5) holds true as long the command queue is executed "in-order", and all kernels are either launched from the same queue, or launched from different queues but serially using a barrier call (e.g., clEnqueueBarrier( )).

In various cases, creating queues with "out-of-order" execution may optimize, and improve, the total amount of time it takes to compute a task, but makes predicting $WCET_{kernel}$ less deterministic. In some cases, $WCET_{kernel}$ is calculated serially, but tasks may be launched "out-of-order" for run time.

Although the examples of FIGS. 5A and 5B make reference to CPU and GPU processing units, the same or similar approach and principles may be used with other types of processing units, such as other SPUs.

In order to determine the WCET, a low-level system profiling tool may be provided in various cases. The low-level system profiling tool may run, for example, on computer 104 of FIG. 1 and on NNM 226, as well on various drivers (e.g., one or more of graphics device drivers 216, graphics and compute device drivers 218, and compute device drivers 220).

In various cases, the profiling tool can build a logical map of all physical devices in system 200, complete with performance characteristics of each device. An API may also expose functionality for an application to provide additional system configuration or implementation details that may be required to complete the profiling, that may otherwise be difficult to extract by running tests on the system.

In some example cases, the low-level system profiling tool can profile memory read/write operations. For example, the profiling tool can profile memory access performance across memory ranges, cache hits and cache misses, page faults and loads, memory bus performance (e.g., 'at rest', under anticipated conditions, and under heavy load conditions). The profiling tool can also profile memory storage (e.g., storage access performance across storage location ranges; cache hits and misses; storage access performance (e.g., 'at rest', under anticipated conditions, and under heavy load conditions)).

In some embodiments, the profiling tool can also profile system characteristics. For example, the profiling tool can profile the system bus performance across various load conditions, networking performance, messaging and inter-process communication, synchronization privatives, and scheduler performance. In other cases, the profiling tool can profile the graphics and compute capabilities (e.g., suitable benchmarks for quantifying graphics, compute and graphics and compute scenarios, as well as schedule performance).

In at least some embodiments, the output of the system profiling tool may be a system definition file (e.g., an XML file) that details the system components and interconnections.

In various embodiments, the system definition file is utilized in conjunction with real-world performance testing and benchmarks of the actual target applications, to calculate the WCET for the system and system components.

For example, in some cases, the profiling tool may include benchmarking tools aimed at profiling "real-world" applications on the system 200. This can include both CPU and graphics/compute profiling, as supported. The profiling tool can also support augmented benchmarking, where the benchmarking environment is artificially influenced. For example, excessive memory bus utilization can be introduced, misbehaving test applications simulated, etc. Accordingly, benchmarking can be used to compile "real-world' benchmark data on the system performance and utilize the information as an input into WCET calculations.

Part of the benchmarking is determining the characteristics of classical machine learning, neural networks, and inference engines being utilized in the target system. This information can be extracted automatically, as well as by exposing explicit APIs to allow applications to provide additional information, as requested (e.g., how many nodes and layers are included within an NNEF file, etc.). Analysis and calculations may be performed to quantity the performance of the machine learning and neural network based on these characteristics (e.g., number of nodes in a neural network). In some cases, neural network calculations may be based on the number of calculations performed, the details of scheduled execution (e.g., a safety-critical schedule), applied against inference engine performance metrics.

In some cases, some of the benchmarking may be automatically performed within the system. For example, neural network benchmarking may be augmented by modifying the configuration of a neural network (e.g., adding/subtracting nodes, adding/subtracting layers). The automatic benchmarking and performance testing is to quantify changes to the neural network, and to extrapolate design change impacts. For example, this can involve quantifying the impact to adding an additional layer to a neural network, increasing the nodes of a neural networks, or the benefits of pruning the neural network connections.

In various embodiments, the output of the implementation of the benchmarking and performance testing, as well as the machine learning, neural network and inference engine characteristics, is a performance result file (e.g., an XML file) that details the tests executed and test results, including execution time metrics.

The WCET may then be calculated using the detailed system information, system characteristics and performance, and "real-world" and augmented "real-world" benchmarking on target hardware, as determined by the profiling tool.

In some cases, if WCET calculations have been determined for a neural network configuration (e.g., a 10-layer neural network), the WCET time can be extrapolated for other neural network configuration (e.g., a 12 layer neural network) using existing WCET data applied to the new neural network configuration. In this manner, WCET calculation can be simplified to accommodate for system changes.

Referring now back to FIG. 2, system 200 can also include a safety manager 215 which interfaces with NNM 226. The safety manager 215 may be responsible for configuring the PDM 222 with respect to which inference engines are permitted to interact with which physical devices 208, 210, and compute resources. In some cases, applications 202, 204, 206 may be permitted to interact with the safety manger 215, based on the system configuration.

In at least some embodiments, the NNM 226 and the safety manager 215 may be configured to only service specific requests from one or more applications. This enables cases where both high and low priority applications can submit workloads to their assigned inference engine, however, only one or more high priority applications can switch a configuration profile. Accordingly, low priority application requests may be rejected by the safety manager 215.

Execution of Workflows Using Specialized Processing Units (SPUs)

Owing to their high processing capabilities, specialized processors (i.e., SPUs 125 in FIG. 1B) are often deployed to increase computation throughput for applications involving complex workflows. It has, however, been appreciated that significant challenges emerge in deploying SPUs for deterministic workflow execution, primarily resulting from the poor deterministic scheduling which can make it difficult to estimate various execution metrics, including worst-case execution times. In particular, the poor execution determinism of various SPUs can prevent harnessing the processing power of these processors in various time critical applications (e.g., safety-critical applications), which otherwise demand high deterministic workflow execution (e.g., workflow execution in a time- and space-bounded manner).

In contrast to SPUs, CPUs can offer comparatively higher levels of execution determinism owing to their ability to allow for higher deterministic scheduling, which can be controlled by a Real Time Operating System (RTOS). However, despite their higher execution determinism, CPU also often lack in comparative computational throughput.

In view of the foregoing, it has been appreciated that complex workflows may be more deterministically processed through a combination of CPUs and SPUs. In particular, as provided herein, a higher level of computational determinism may be achieved for executing complex workflows by leveraging the combination of the CPUs' higher execution determinism while capitalizing on the computational power of SPUs.

Figure 10:
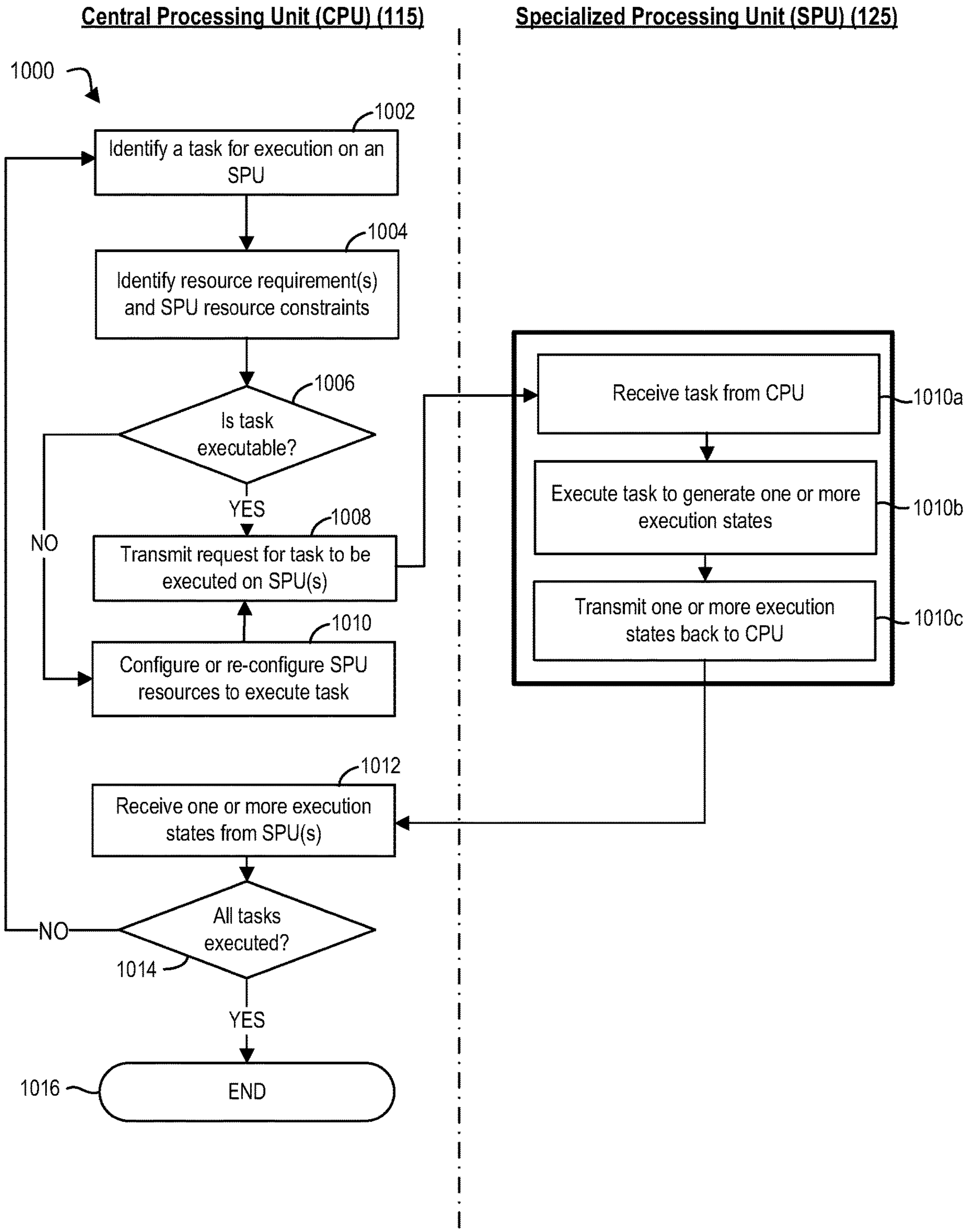
FIG. 10 is an example method for time-bounding execution of workflows using a combination of central processing units (CPUs) and specialized processing units (SPUs), according to some embodiments.

Referring now to FIG. 10, which shows an example method 1000 for higher deterministic execution of workflows using a combination of CPUs and SPUs.

As shown, at 1002, an application (e.g., applications 202-206 on computing platform 200)—executing on the CPU 115—can identify (or generate) a workload task for execution on one or more SPUs 125.

At 1004, the application—executing on the CPU 115—can identify the compute resource requirements for executing the workload task. For example, this can involve identifying the memory and processing requirements for executing the task, which may be specified by each application in the workload request. The application can also identify the compute capabilities for one or more SPUs located in the system. For instance, as explained previously, in the computing platform 200, the application can automatically receive, or otherwise query the NNM 226, via the NNM API 227, for various resources capabilities of the system SPUs.

At 1006, based on the information data identified at 1004, the application can determine whether or not there are sufficient SPU resources (e.g., memory and processing resources) available to execute the task. In at least some embodiments, the determination at 1006 involves determining or estimating whether the task can execute on the available SPU resources within a pre-determined Healthy Case Execution Time (HCET), as previously explained herein.

At 1008, if the application determines that there are sufficient compute resources to execute the task (e.g., within the HCET), the application may transmit a request for the task to be executed on one or more designated SPU(s). In at least some embodiments, the task request submitted by the application at 1008 can be a high-level API command. For instance, in the computing platform 200, an application (e.g., 204 or 206) can submit a workload request to the NNM 226, via the NNM API 227. In various cases, in addition to transmitting a request for executing the task, the application can also submit, at 1008, a request (e.g., to the NNM 226) for compute resource allocation for executing the task, based on available SPU resources, as also previously provided herein.

At 1010, if it is determined that there are insufficient SPU resources to execute the task (e.g., the task cannot execute within the HCET), the application may request configuring or re-configuring SPU resources to allow more compute resources to enable appropriate task execution. For example, as provided herein, in the computing platform 200, the application may request the NNM 226 to increase the priority level of the task (e.g., a "high priority"). In turn, the NNM 226 may adopt a "High Priority Execution Profile" (e.g., method 300 in FIG. 3), as explained previously, and allocate a greater number of SPU compute resources to executing the task, or otherwise, instruct the PDM 222 to pre-empt currently executing tasks and re-assign SPU resources to the task requiring execution.

Once the SPU resources have been configured, or re-configured, to allow for appropriate task execution, the method 1000 can return to 1008, and the task can be transmitted for execution to one or more designated SPU(s).

The one or more SPU(s), designated to execute the task, can receive the task from the CPU (1010*a*), execute the task to generate one or more corresponding execution states (1010*b*), and transmit the one or more execution states back to the CPU (1010*c*). In some cases, at 1010*c*, the SPU(s) may store the one or more generated execution states in a memory accessible to both the CPU and SPU(s) (e.g., memory unit 130 in FIG. 1B).

In various embodiments, where the method 1000 is performed on the computing platform 200, the execution of tasks on the SPUs (1010*a*-1010*c*) can be monitored (e.g. by NNM 226)—during execution—to determine if the execution is exceeding the pre-determined Healthy Case Execution Time (HCET). If this is determined to be the case, resource re-allocations can be made to ensure that the task is executed within the HCET, as previously provided herein (e.g., method 300 of FIG. 3).

At 1012, the CPU can receive the one or more execution states from the SPU(s) (e.g., by retrieving the execution states from the memory).

At 1014, the CPU can determine if all tasks have been executed in a workflow. If all tasks are determined to be executed, the method 1000 can end at 1016. Otherwise, the method 1010 can return to 1002, and iterate until all tasks have been executed by the SPU(s).

While method 1000 illustrates tasks being executed sequentially (e.g., one task per iteration), it will be appreciated that method 1000 can also provide for concurrent execution of multiple tasks on separate SPUs. For example, multiple occurrences of acts 1002—1012 may occur on separate SPUs to allow for concurrent execution of different tasks on different SPUs.

Execution of Fast Fourier Transform (FFT) Operations

In various cases, computing platforms may also be used for performing Fast Fourier Transforms (FFTs) for various applications. For example, a computing platform can perform FFT calculations to assist in image processing (e.g., edge detection) for object recognition in image data for collision avoidance systems used in autonomous vehicles. In other cases, collision avoidance systems may perform FFTs on radar signals to determine proximal objects. In still other cases, the FFT may be performed to process audio signals (e.g., de-compose a multi-frequency audio signal into one or more audio frequency components). In some cases, the digital signal processing technique can be used concurrently with a neural net-based operations to perform safety-critical tasks (e.g., collision avoidance). In at least some cases, the FFT computation may be performed in the system environment 200 of FIG. 2, in which a safety-critical compute application 230 performs Fast Fourier Transform (FFT) computations.

It has been appreciated, however, that traditional FFT algorithms are recursive in nature and, in turn, may be difficult to implement deterministically. Accordingly, traditional FFT methods may not be suited for safety-critical applications which require data processing in limited time frames.

In view of the foregoing, and in accordance with embodiments provided herein, there is provided a system and method for performing FFT using an optimized, non-recursive algorithm that avoids kernel branches, loops and thread level synchronization points, while maintaining an acceptable performance level. In particular, the proposed optimized, non-recursive FFT technique allows for linear, parallelized FFT execution to increase execution determinism. The described embodiments may be implemented, for example, in the Vulkan Compute application programming interface (API).

It will be appreciated that while a specific example of an FFT computation is provided herein, the same techniques may be used for other types of computation, as described elsewhere herein.

More particularly, Fast Fourier Transforms (FFT) are an extension of Discrete Fourier Transforms (DFTs). Equation (6) expresses the formula for calculating the DFT for a signal sampled N times:

$$F_k = \sum_{n=0}^{N-1} X_n \cdot e^{\frac{-i2\pi kn}{N}} \tag{6}$$

wherein $F_k$ is the DFT of sequence $X_n$, N is the number of samples, and the DFT is calculated by sweeping k and n between zero and N−1. The term $$e^{\frac{-i2\pi kn}{N}}$$

may be also expressed as $(\omega_N)^k$, also known as the Twiddle factor.

Equation (7) expresses the calculation for one sample (e.g., N=1):

$$F_0 = X_0 \cdot e \frac{-i2\pi(0)(0)}{N} \tag{7}$$

Equations (8) and (9) express the calculation for two samples (e.g., N=2):

$$F_0 = X_0 \cdot e^{\frac{-i2\pi kn}{N}} + X_1 \cdot e^{\frac{-i2\pi kn}{N}} \tag{8}$$

$$F_1 = X_0 \cdot e^{\frac{-i2\pi kn}{N}} + X_1 \cdot e^{\frac{-i2\pi kn}{N}} \tag{9}$$

As shown, four computations are required for a signal sampled N=2. Accordingly, a significant drawback of a DFT method is that for a continuous signal which is sampled N times, the number of required calculations is $O(N^2)$. For large sample size N, the DFT may require large computation time, and large computational resources. In other words, the DFT may not be ideal for safety-critical tasks which involve processing large input arrays.

To mitigate the drawback of DFT, Fast Fourier Transforms (FFTs) are used to reduce the number of calculations from $O(N^2)$ to O(N log N). FFTs operate by taking advantage of the periodicity of the sinusoidal nature of a signal. Equation (10) expresses the formula for calculating an FFT:

$$F_k = \sum_{m=0}^{N/2-1} X_n \cdot e^{\frac{-i2\pi(2m)}{\frac{N}{2}}} + \sum_{m=0}^{N/2-1} X_n \cdot e^{\frac{-i2\pi(2m+1)}{\frac{N}{2}}} \tag{10}$$

In particular, the FFT algorithm divides the input data into a block of values having even indices, and a block of values having odd indices. The DFT calculation is then performed, separately, and simultaneously for the even and odd value blocks.

In some cases, an FFT can be performed using RADIX-2 Decimation in Time (DIT), whereby the input data is recursively divided into blocks having even and odd indices, and calculating the DFT for each block. Each instance the input data is further divided, the number of required operations is correspondingly halved.

Figure 6:
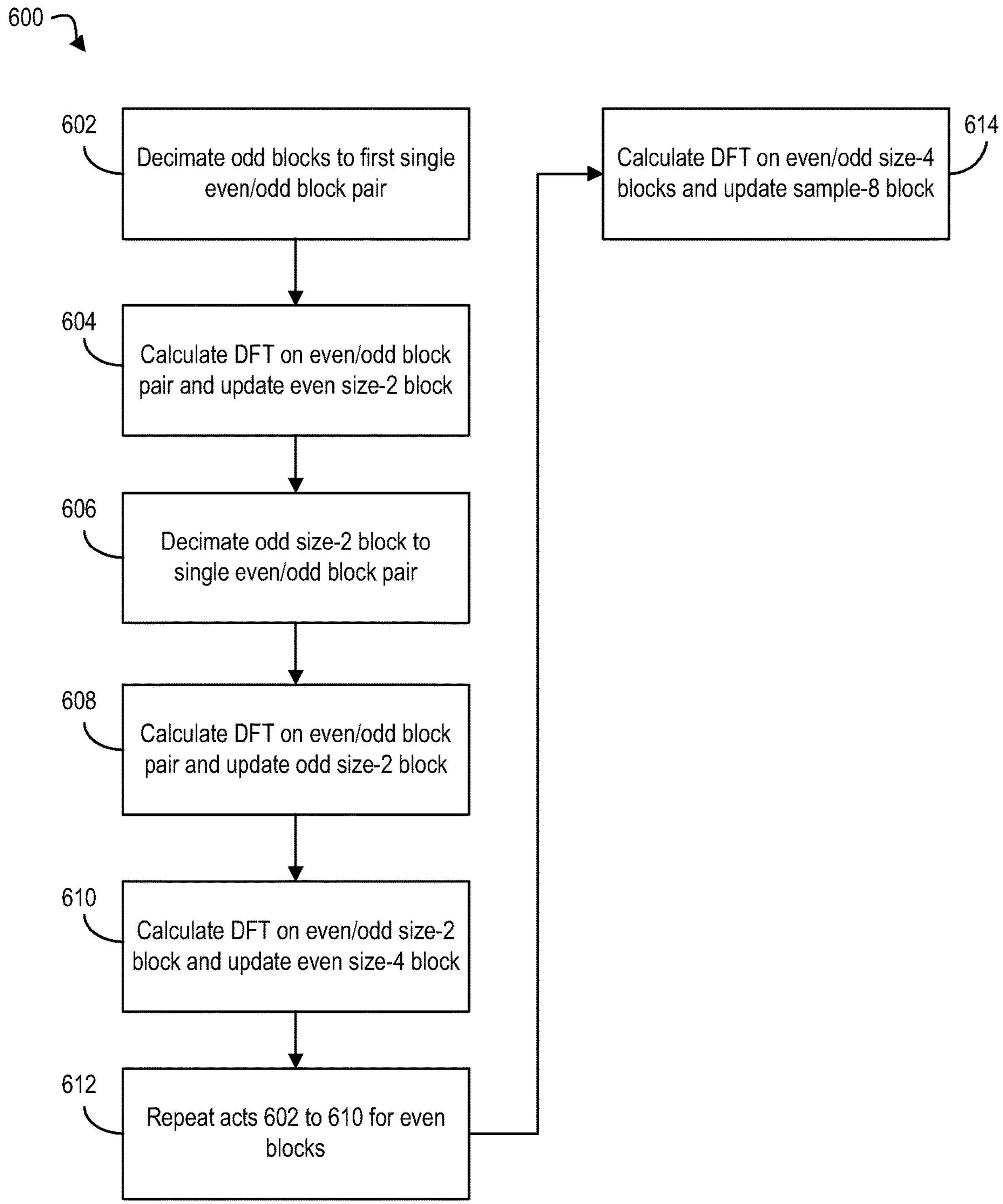
FIG. 6 is an example process flow for a method for performing Fast Fourier Transforms (FFT) using a RADIX-2 Decimation in Time (DIT) of a Discrete Fourier Transform (DFT)

Referring now concurrently to FIG. 6 and FIGS. 7A-7F. FIG. 6 shows an example process flow for a method 600 for performing FFT using a RADIX-2 Decimation in Time (DIT) of the DFT. Method 600 assumes the FFT is performed on a signal having a sample size of eight. FIG. 7A-7F provides a visualization of method 600.

Figure 7A:
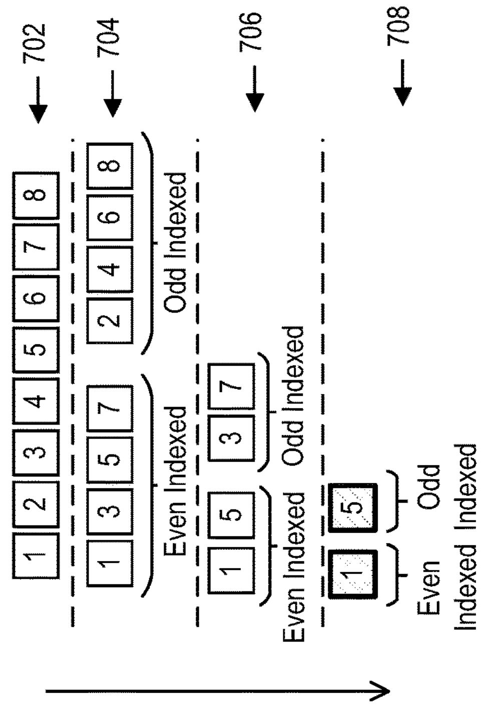
FIGS. 7A-7G are example illustrations for visualizing the method of FIG. 6.
Figure 7B:
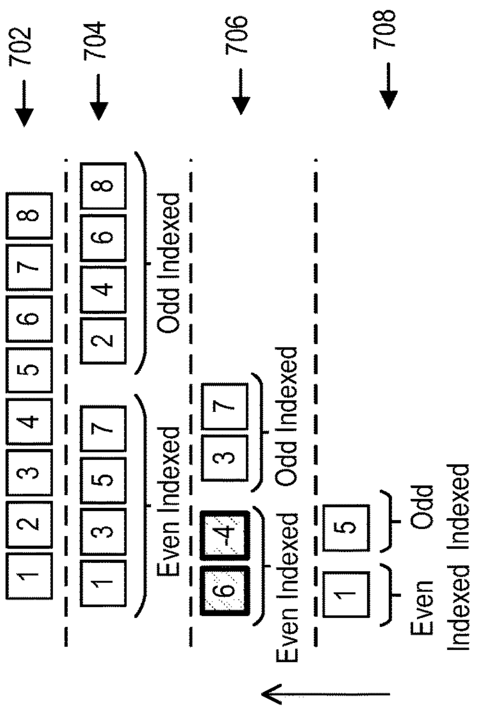

At 602, the vector block of eight samples is iteratively decimated (e.g., halved) into the first single even/odd block pair. For example, as shown in FIG. 7A, the vector block of eight samples 702 is decimated to the first single odd/even block pair 708.

At 604, the DFT of the first odd/even block pair is calculated. The calculated DFT is then used to update the even size-2 block pair 706 (e.g., FIG. 7B).

Figure 7C:
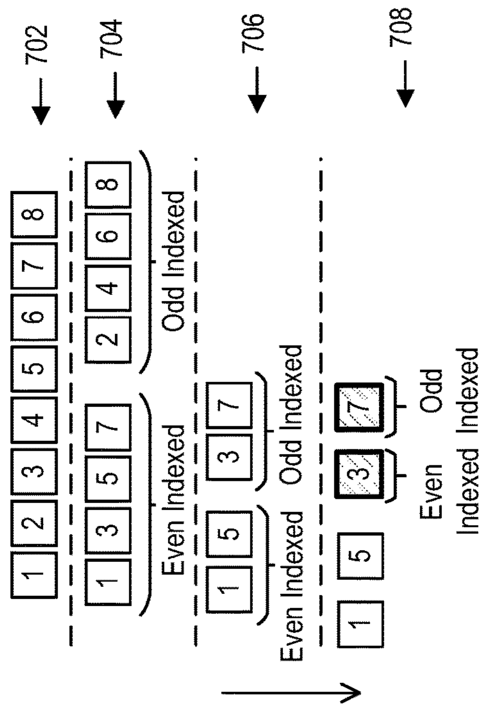

At 606, the first odd size-two block is decimated to a single even/odd block pair 708 (e.g., FIG. 7C).

Figure 7D:
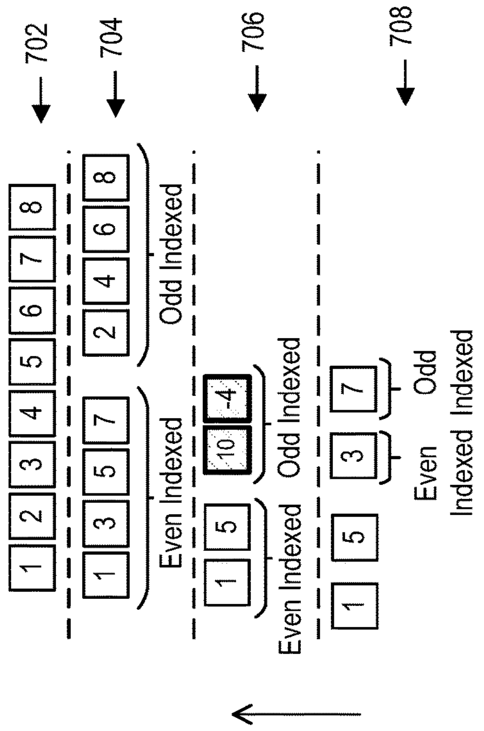

At 608, the DFT of the second odd/even single block pair is calculated and is used for updating the odd size-2 block 706 (e.g., FIG. 7D).

Figure 7E:
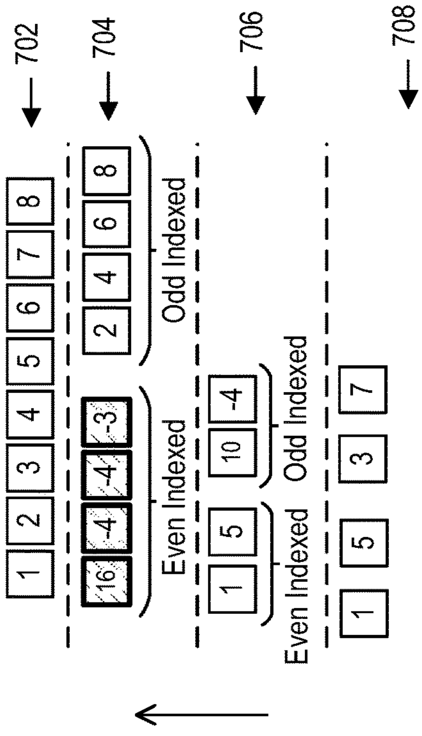
Figure 7F:
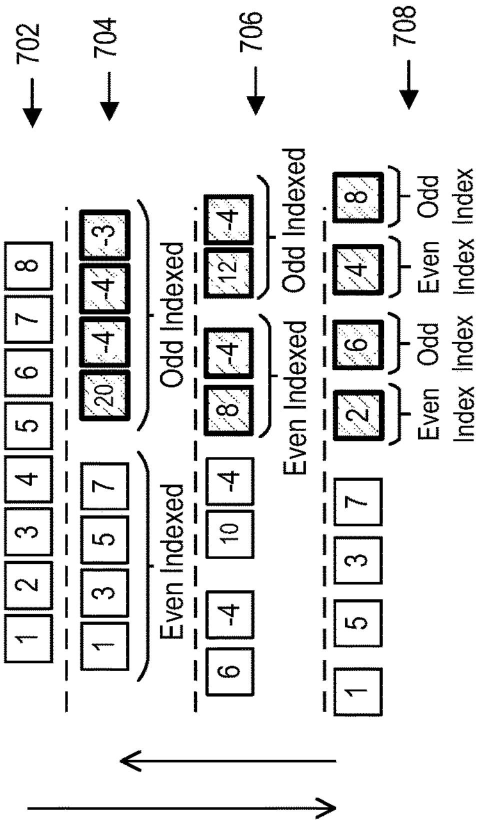

At 610, the DFT of the odd/even size-2 block pairs 706 are calculated, and used for updating the odd size-4 block 704 (e.g., FIG. 7E).

At 612, acts 602 to 610 are repeated for the size-4 even block 704. In other words, the size-4 block is decimated to the first even/odd single block pair, and the DFTs are iteratively calculated to update higher sized blocks (e.g., FIG. 7F).

Figure 7G:
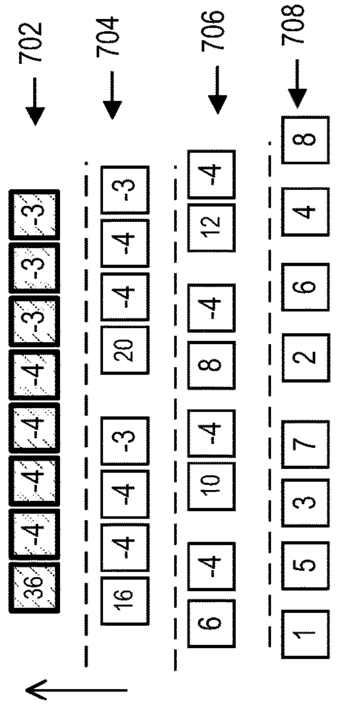

At 614, the DFT is calculated for the updated size-4 odd block and size-4 even block. The calculated DFT is then used to update the size-8 vector 702 (FIG. 7G). In this manner, the DFT calculation for the size-8 vector is complete.

Accordingly, it will be appreciated that the inherently recursive nature of the method 600 is not suited for safety-critical applications. In particular, a computer implementation of the method 600 is first required to work out the decimation for each step using the CPU, and then submit a computation workload for the CPU to perform each individual DFT calculation. As shown, this requires at least seven workload submissions simply for the block of even indices (e.g., FIGS. 7A-7E), and each workload would perform minimal calculations.

In view of the foregoing, there is a desire for a more optimized and non-recursive method of performing FFT that is better suited for safety-critical applications. The optimized method ideally requires less workload submissions and offers more deterministic execution on an SPU. Further, the non-recursive algorithm may be implemented using a compute API, including, e.g., OpenCL, CUDA, or Vulkan Compute, in a more optimized manner.

Figure 8:
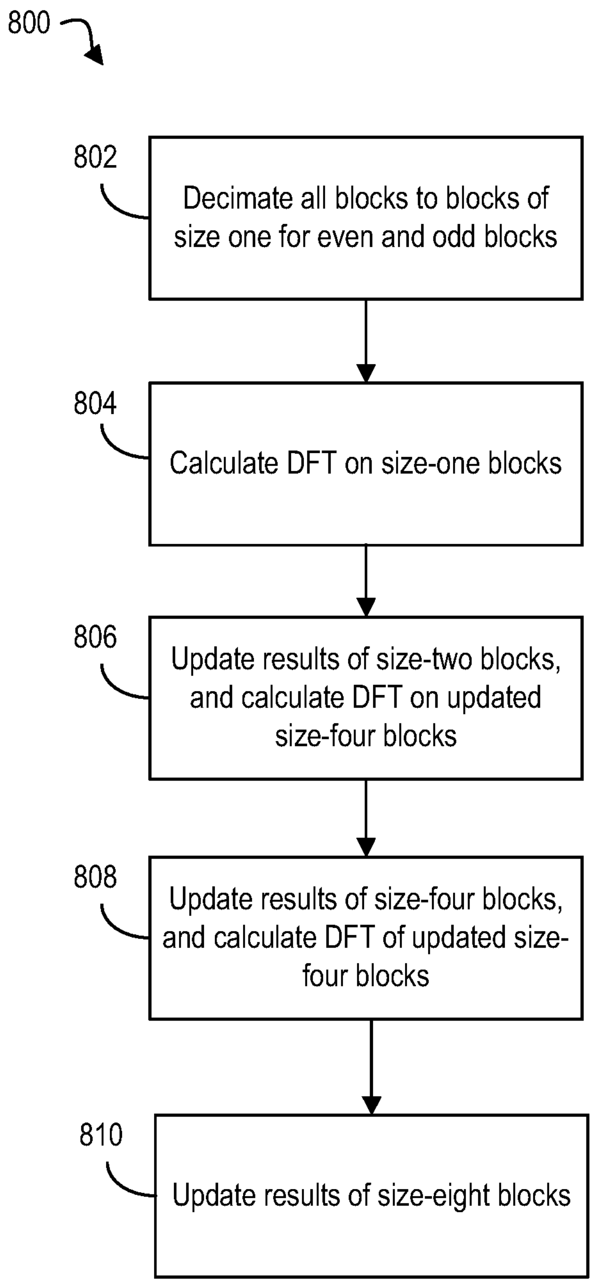
FIG. 8 is an example process flow for an optimized, non-recursive method for performing Fast Fourier Transforms (FFT) using a RADIX-2 Decimation in Time (DIT) of a Discrete Fourier Transform (DFT), according to some embodiments.
Figure 9A:
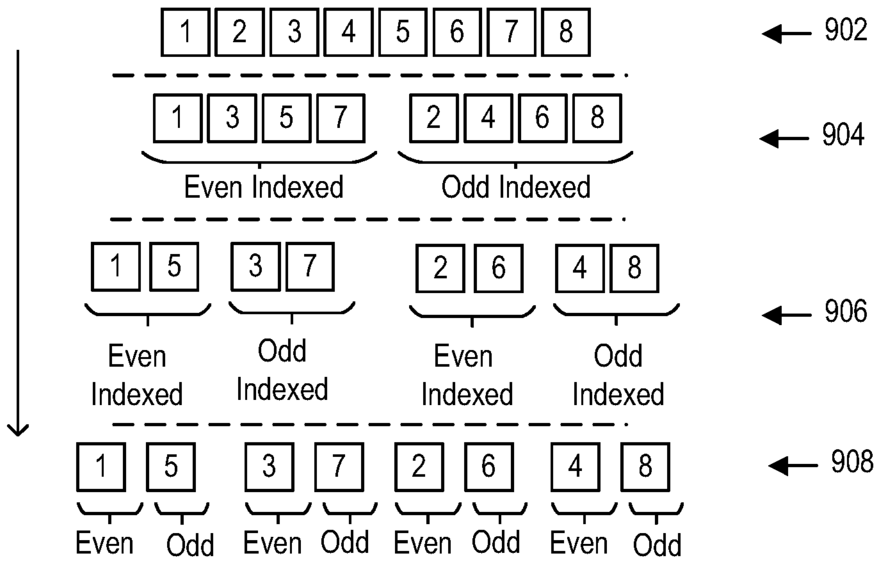
FIGS. 9A-9D are example illustrations for visualizing the method of FIG. 8.
Figure 9B:
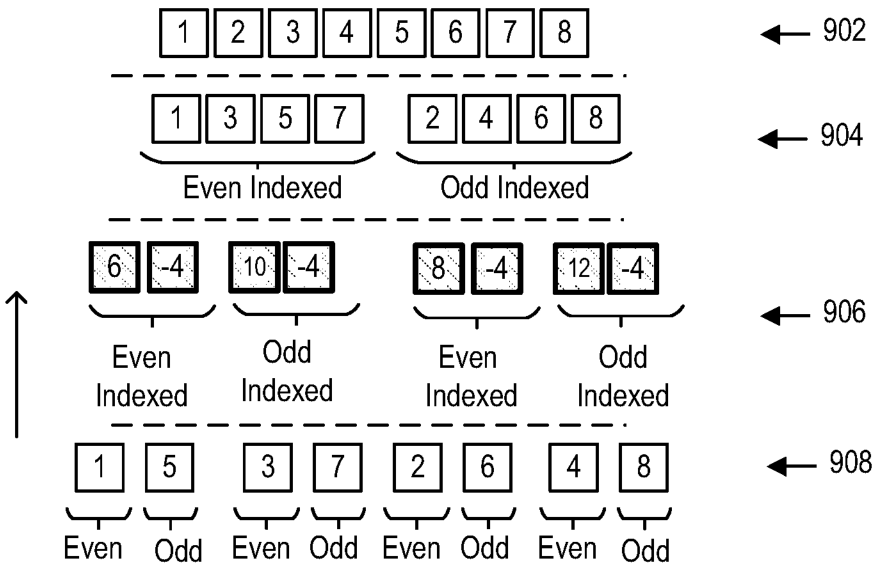

Referring now concurrently to FIG. 8 and FIGS. 9A-9B. FIG. 8 shows an example process flow for a method 800 for an optimized FFT using a RADIX-2 Decimation in Time (DIT) of the DFT. Method 800 assume the FFT is performed on a signal having a sample size of eight. In various cases, method 800 can be performed by the FFT implementer 230 of FIG. 8. FIG. 9 shows a visualization of the method 800. The method 800 can be performed by one or more processing units (e.g., CPUs 115 and/or SPUs 125 of FIG. 1B).

At 802, the method begins with decimating all blocks in the arrays to blocks of size one, for even and odd blocks. Accordingly, as shown in FIG. 9A, the array 902 is decimated to an array of size four blocks 904, then subsequently to an array of size two blocks 909, and then to single size blocks 908.

At 804, the DFT is calculated for the size one blocks 908. In the example case of FIG. 9A, the DFT at 804 is calculated using the following DFT computation: [DFT([1][5]), DFT([1][5])] [DFT([3][7]), DFT([3][7])] [DFT([2][6]), DFT([2][6])] [DFT([4][8]), DFT[4][8])]. The FFT calculation is performed twice using the same pair of values because the input for the even and odd calculations are the same, with the only change being the sign of the Twiddle factor.

At 806, the results of the DFT calculation at 804 is used to update the size two block array 906 (FIG. 9B). The DFT of the updated size two block array 906 is then calculated to update the size four block array 904. The formula used for calculating the DFT of the size two block array 906 may be expressed as follows: [DFT(16,20), DFT(−4,−4), DFT([6, 10]), DFT(−4,−4)] [DFT(8, 12), DFT(−4,−4), DFT([8,12]), DFT(−4,−4)].

Figure 9C:
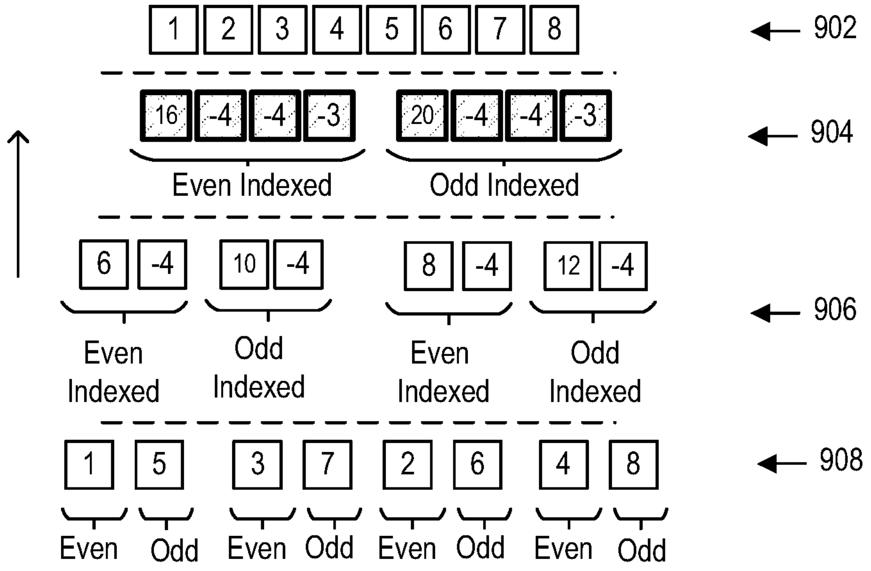

At 808, the results of the DFT calculation at 806 is used to update the size four block array 908 (FIG. 9C). The DFT of the updated size four block array 908 is then calculated to update the size eight block array 910. The formula for calculating the DFT of the size eight block array 910 may be expressed as follows: [DFT(16,20), DFT(−4,−4), DFT(−4, −4), DFT(−3,−3), DFT(16, 20), DFT(−4,−4), DFT(−4,−4), DFT(−3,−3)].

Figure 9D:
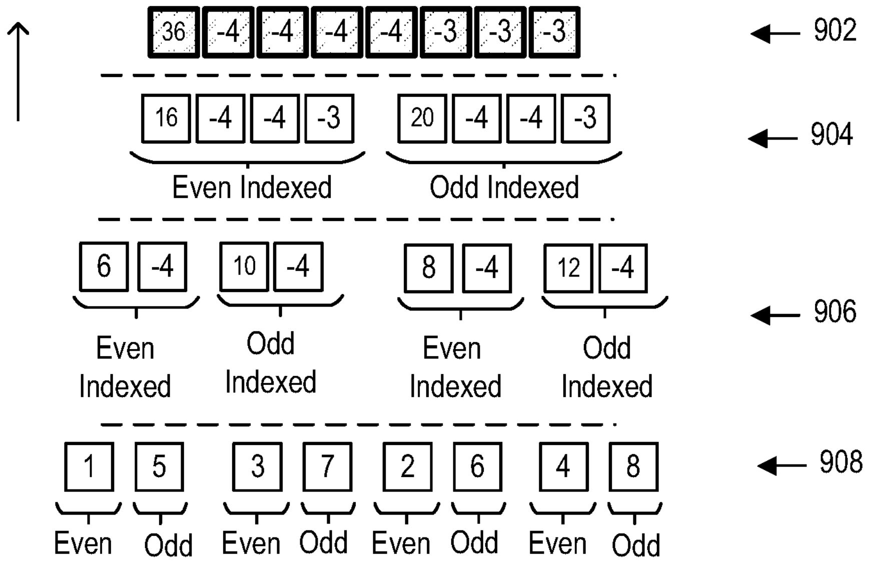

At 808, the results of the DFT calculation at 808 is used to update the size eight block array 908 (FIG. 9D).

Accordingly, method 800 requires only three workloads for an input array of size eight (e.g., three sets of DFT calculations 804—808), which generalizes to $Log_2(N)$ workloads for an N-length array. This results in the $N*Log_2(N)$ performance, typical of FFTs.

In particular, the difference between the recursive method 600 and the non-recursive method 800 is that the non-recursive method 800 decimates all blocks resulting in N values that require DFT calculations which can be computed in parallel workloads, and the results fed to the higher sized blocks, also resulting in N computations.

In cases where the FFT computation is performed in the environment system 200 of FIG. 2, the system 200 can also include an API 232 The API 232 may provide applications 204, 206 with an interface for the safety-critical compute application 230. In embodiments where the safety-critical compute 230 is used for FFT computations, the API 232 may be an FFT API 232. For example, applications can submit vector arrays for FFT computations to safety-critical compute 230, via the FFT API 232. In various cases, API 232 may allow applications, which perform FFT calculations on a CPU, or using an OpenCL, to transition to a Vulkan Compute. The FFT API 232 may also be flexible enough to allow applications to design and control the workflow of the FFT computation. For instance, the FFT API 232 may allow the application to control whether to apply the FFT to a single input buffer, or apply FFT to a number of input buffers simultaneously. In various cases, the FFT API 232 may perform discrete tasks it has been allocated, while allowing the applications 204, 206 to manage synchronization and coordination of the FFT results with other workloads. In some embodiments, the FFT API 232 may have one or more restrictions. For example, the FFT API 232 may restrict input arrays to arrays which contain N samples, where N is a power of two. Further, the number of elements in the input in each row must be equal to or less than eight, and the number of rows in each matrix for a 2-D operation must also be greater or less than eight.

Execution of Convolutional Neural Networks (CNNs)

Convolutional neural networks (CNNs), have in recent years, found widespread application including use in many image processing applications. For example, various computer vision applications (e.g., deployed in automated, self-driving vehicles) rely on CNNs for semantic segmentation of images for image classification and surrounding object recognition. Beyond image processing, CNNs have also found application in other fields, including natural language processing and audio processing.

Figure 11:
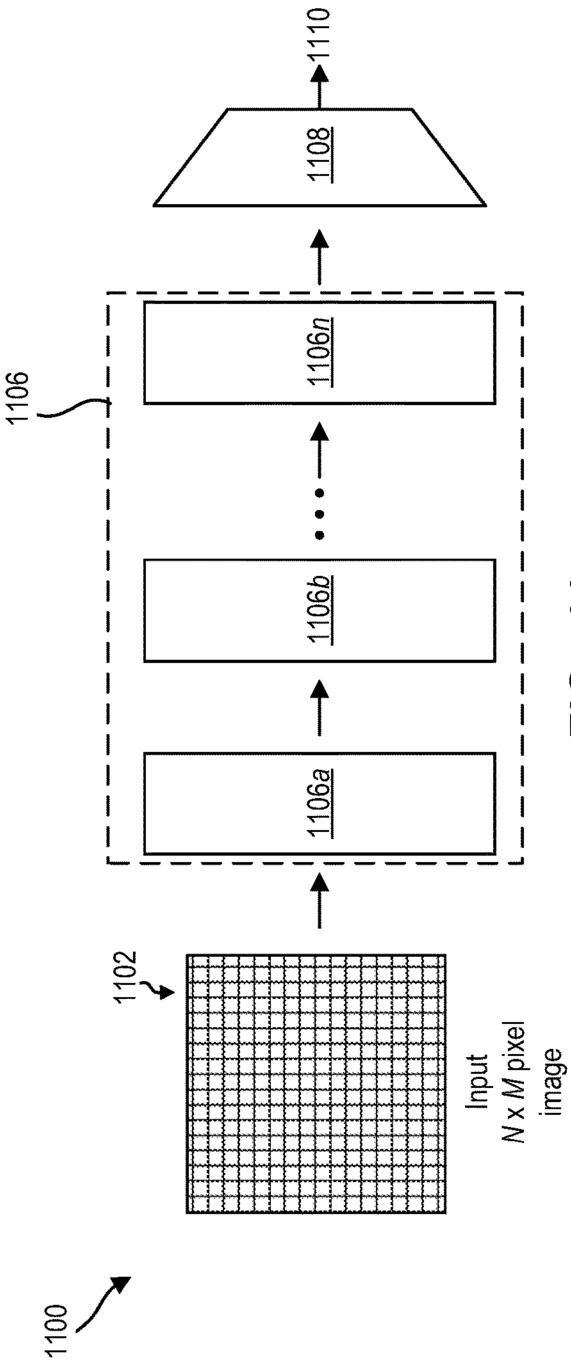
FIG. 11 is a simplified block diagram for a conventional process for implementing a convolutional neural network (CNN)

Referring now briefly to FIG. 11, which illustrates a simplified block diagram for a conventional process 1100 for implementing a CNN. The process 1100 has been illustrated as being applied to an input image 1102, however the same process 1100 can be applied to other input data. The process 1100 may be implemented, for example, using one or more system processors (e.g., CPUs 115 and/or SPUs 125 in FIG. 1B)

As shown, an input image 1102 of N×M pixel dimensions is fed into a CNN. The CNN generally includes two segments: a feature extraction segment 1106, and a classifier segment 1108. The feature extraction segment 1106 includes a plurality of layers **1106*a*-1106*n* which include, for example, one or more of convolution layers, rectified linear units (ReLU), and pooling layers. The classifier segment 1108 may include, for example, fully connected layers, and is configured to generate a prediction 1110** (e.g., an image classification).

In conventional processing of CNNs, the complete input image 1102 is sequentially fed into each consecutive layer of the feature extraction segment 1106, before the output is fed to the classifier 1108. In some cases, the input image may be fed into the feature extraction segment 1106 as a single width array of length N*M.

Figure 12:
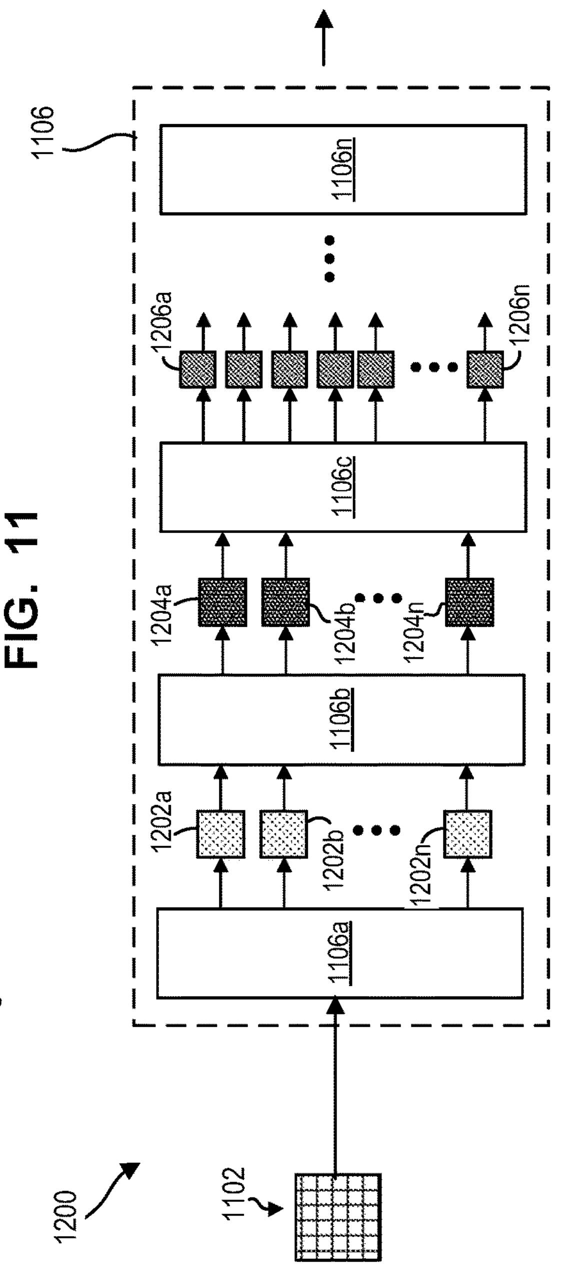
FIG. 12 is a simplified block diagram for a conventional process for implementing a feature extraction segment of a convolutional neural network (CNN)

Referring now briefly to FIG. 12, there is shown a simplified diagram of a portion of the feature extraction segment 1106 of FIG. 11.

As shown, at each layer **1106*a*-1106*n*, of the feature extraction segment 1106**, one or more intermediate images are generated. The intermediate images generated are fed as inputs to the next layer in the sequence of layer operations.

In the illustrated embodiment, the first layer 1106 is a convolution layer that applies a plurality of filters to the input image 1102 (e.g., 64 filters). The number of output images **1202*a*-1202*n*, generated by the first layer 1106*a*, correspond to the number of filters in the first layer (e.g., 64 output images). The output of the first layer 1106*a* is then fed to a second layer 1106*b***.

In the example embodiment, the second layer **1106*b* can be an ReLU layer (e.g., an ReLU layer that applies an elementwise activation function), or a pool layer (e.g., a pool layer that performs a down-sampling operation to each image). The ReLU or pool layer generally generate a number of outputs images (e.g., 1204*a*-1204*n*) equal to the number of filters which comprise the layer. The output of the second layer 1206*b* is then fed into the third layer 1206*c*, which can be yet another convolution layer. The convolution layer 1106*c* again applies—to each input images 1204*a*-1204*n*—a pre-determined number of filters (e.g., 10 filters), such that the number of output images 1206*a*-1206*n* increases (e.g., 64 images×10 filters=640 intermediate output images). The process can continue until the final layer 1206*n***, whereby at each convolution layer, the number of intermediate images increases multi-fold.

Conventional approaches to performing CNNs may demand large amount of memory and processing resources, especially for large data sets (e.g., images with large pixel array dimensions). In particular, this is due to the increasing number of intermediate data arrays (e.g., intermediate images) generated at each convolution layer which, in turn, demands greater memory reservation and increasing processing power to process the larger volume of data. This, in turn, presents challenges in attempting to process large input data in systems (e.g., computing platforms) having limited memory and/or compute resource availability.

Figure 13:
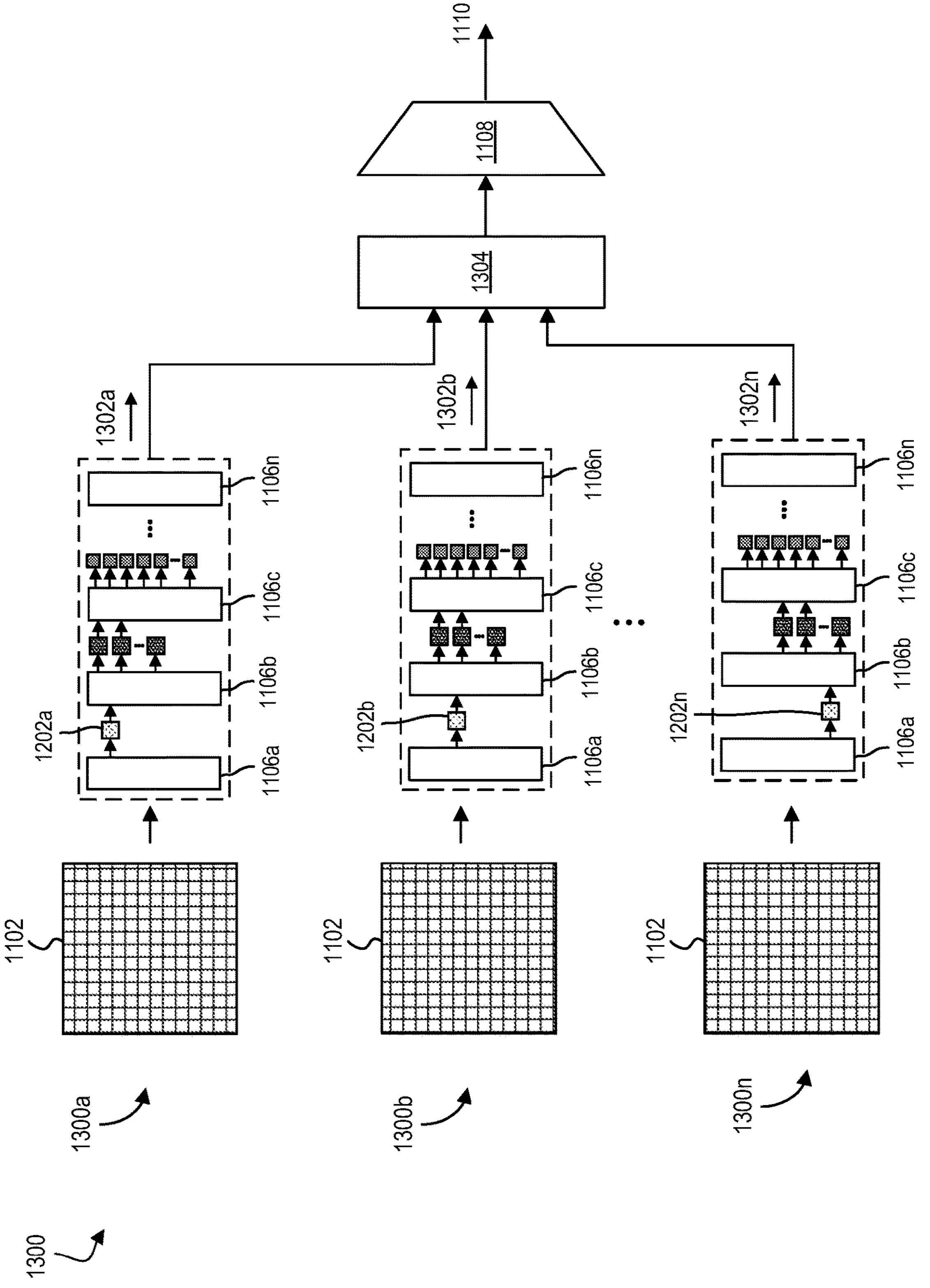
FIG. 13 is a simplified block diagram for an example process for execution of CNNs, according to some embodiments.

Referring now to FIG. 13, there is shown a simplified block diagram for an example process 1300 for implementing a convolutional neural network (CNN), according to some other embodiments. As provided herein, process 1300 may allow for implementing CNNs using less memory than in conventional approaches, especially for large input data sets. In particular, rather than executing all layer operations in-order, the process 1300 allows for an "out-of-order" execution of layer operations. The process 1300 can implemented, for example, using one or more system processors (e.g., CPUs 115 and/or SPUs 125 in FIG. 1B).

Process 1300 illustrates an example embodiment where the first and third feature layers 1106*a*, 1106*c* are convolution layers, and the second layer 1106*b* is a ReLU or pooling layer.

The process 1300 begins at 1300*a*, whereby the input image 1102 is processed by the first convolution layer 1106*a*. As shown, rather than applying each filter of the convolution layer 1106*a* to the input image (e.g., all 64 filters), only a single filter of layer 1106*a* is applied to generate a single intermediate output image 1202*a*. The output image 1202*a* is then fed and processed by the remaining layers 1106*b*-1106*n* to generate a first intermediate output 1302*a*. The first intermediate output 1302*a* is then stored in a memory buffer 1304 (e.g., memory 130 in FIG. 1B). Process 1300 then proceeds to 1300*b*, whereby the input image 1102 is again processed by the first convolution layer 1106*a*. However, in this iteration, the second filter of layer 1106*a*, is applied to the input image, to generate a second image output 1202*b*. Again, the output image 1202*a* is processed by the remaining layers 1106*b*-1106*n* to generate a second intermediate output 1302*b*, which is also stored in the memory buffer 1304. The process 1300 continues to iterate until 1300*n*, whereby the final filter of the first layer 1106*a* is applied to the input image, and the final intermediate output 1302*n* is stored in the memory buffer 1304. Once all intermediate outputs 1302*a*-1302*n* are generated, the buffer layer 1304 can synchronize the intermediate outputs, and concurrently feed the intermediate outputs to the classification layer 1108 to generate the final output 1110.

Accordingly, process 1300 operates by segmenting execution of the CNN, such that only a limited number of layer sub-operations are performed at each iteration, rather than executing the entire layer. In particular, in the example of FIG. 13, as only a single filter is applied at the first layer 1106*a*, the number of operations for subsequent layers is reduced as compared to applying all filters at the first layer 1106*a* (FIG. 12). This, in turn, reduces the memory required to execute the complete CNN at each intermediate step. Further, it will be appreciated that once an intermediate output 1302 is generated for a given iteration, the compute resources used in generating the intermediate output 1302 can be freed and are able to be re-used in the next iteration. In view of the foregoing, the process 1300 allows for processing large input data arrays in compute systems having low memory or processing availability.

While process 1300 illustrates only a single filter being applied at the first layer 1106*a* for each iteration, it will be appreciated that in other embodiments, any pre-determined subset of filters can be executed at the first layer 1106*a*.

Further, it will also be appreciated that other "out of order" techniques can be used to also provide for reduced use of memory and processing power. In other words, rather than only the first layer 1106*a* partially executing (FIG. 13), the same process can equally apply by selecting any one or more layers 1106 for partial execution during each iteration. For instance, the ReLU layer or the pooling layer may only execute on a portion of the input data in a given iteration. Accordingly, it is appreciated that many combinations and permutations of the process 1300 are possible.

In some embodiments, backward (e.g., reverse) dependency mapping is used to allow for partial execution of layers. For example, in one embodiment, the final layer 1106*n* (rather than the first layer 1106*a*) is selected for partial execution during each iteration of the method 1300. Recognizing the interdependency between the final layer and previous layers (e.g., upstream layers), backward mapping is used to determine which upstream layer operations are necessary to execute and generate sufficient data for successful execution of each sub-operation of the final layer. Based on this mapping, in any given iteration, only the necessary upstream layer operations are executed to allow for executing select sub-operations in the final layer in a given iteration.

Figure 14:
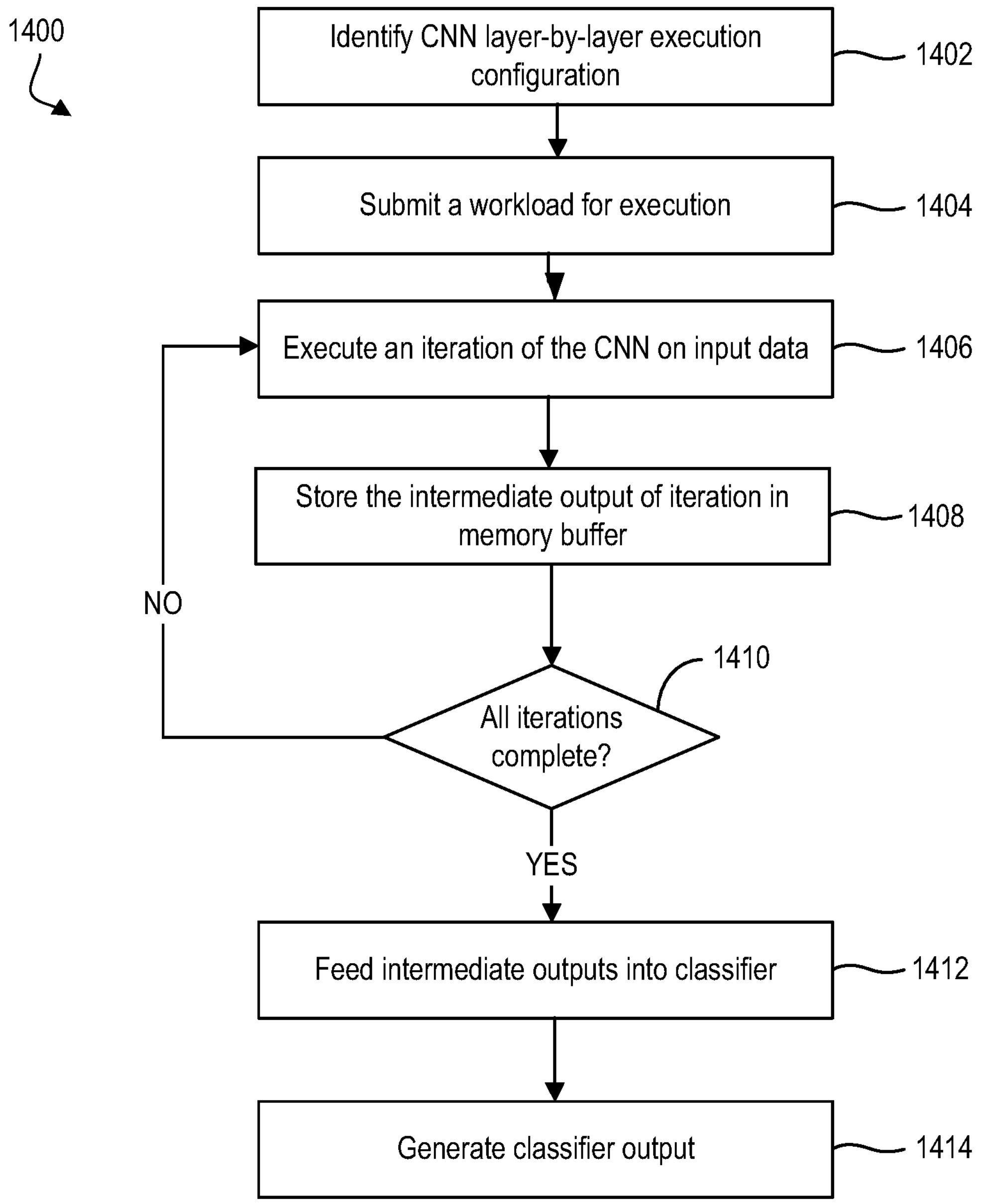
FIG. 14 is an example process flow for a method for execution of CNNs, in accordance with some embodiments.

Referring now to FIG. 14, which illustrates an example process flow for a method 1400 for execution of CNNs, in accordance with some embodiments. The method 1400 can be performed by an application executing on one or more processors (i.e., CPUs 115 and SPUs 125 in FIG. 1B).

At 1402, a layer-by-layer execution configuration can be identified for executing a CNN. In particular, the execution configuration identifies the one or more sub-operations for each layer (e.g., filters in a convolution layer) to be executed in a given iteration of the method. In various cases, the execution configuration may be pre-set, or pre-defined offline by the CNN model developer. In some cases, where the method 1400 is executed on the computing platform 200, an application—executing on the CPU—can provide the NNM 226 with a CNN model, as well as the CNN execution configuration.

At 1404, an application can submit a workload (e.g., input data) for execution on the CNN. For example, in computing platform 200, applications 204-206 can submit workload requests to the NNM 226, via NNM API 227.

At 1406, according to the execution configuration identified at 1402, an iteration (e.g., the first iteration) of the CNN can be executed using the input data (e.g., 1300*a* in FIG. 13).

At 1408, the intermediate output resulting from the first iteration is stored in a memory buffer (e.g., memory buffer 1304 in FIG. 13).

At 1410, a determination can be made as to whether the all iterations are complete. If not, the method can return to 1404 to execute the next CNN iteration. Otherwise, at 1412, the intermediate outputs stored in the memory buffer can be fed into the classifier layer (e.g., 1108 in FIG. 13), such that a classifier prediction output is generated 1412.

It will be appreciated that it is not necessary to perform each iteration of method 1400 sequentially by the same processor. For example, it may be possible for different iterations to be performed concurrently by separate processors. For example, in FIG. 13, each of 1300*a* and 1300*b* can be performed concurrently by separate processors.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail since these are known to those skilled in the art. Furthermore, it should be noted that this description is not intended to limit the scope of the embodiments described herein, but rather as describing exemplary implementations. Various modification and variations may be made to these example embodiments without departing from the spirit and scope of the invention, which is limited only by the appended claims.

The invention claimed is:

1. A method for operating a computer system for performing time-bounding execution of a workflow, the workflow comprising a plurality of workload tasks, the computer system comprising at least a central processing unit (CPU) and at least one specialized processor having a parallelized computing architecture, the method comprising operating the CPU to:

identify a resource requirement for executing each workload task of the plurality of workload tasks;

determine a resource constraint for the at least one specialized processor, each specialized processor of the at least one specialized processor comprises an accelerator configured for providing parallelized computing processing;

based on the resource requirement and the resource constraint, determine whether the at least one specialized processor can execute each workload task of the plurality of workload tasks within a predetermined time, wherein if the at least one specialized processor can execute at least one workload task within the predetermined time, transmit the at least one workload task to the at least one specialized processor for execution, otherwise, based on the resource requirement and the resource constraint associated with one or more remaining workload tasks, the method comprises operating the CPU to select one of:

configuring the at least one specialized processor to execute the one or more remaining workload tasks within the predetermined time, and transmit the one or more remaining workload tasks for execution on the at least one specialized processor; and executing, at the CPU, the one or more remaining workload tasks within the predetermined time.

2. The method of claim 1, wherein the at least one specialized processor is selected from the group consisting of a graphic processing unit (GPU), a neural processing unit (NPU), a tensor processing unit (TPU), a neural network processor (NNP), an intelligence processing unit (IPU) or a vision processing unit (VPU).

3. The method of claim 1, further comprising operating the at least one specialized processor to execute the at least one workload task to generate one or more corresponding execution states.

4. The method of claim 3, wherein the computer system further comprises a memory storage in communication with the CPU and at the at least one specialized processor, and the method further comprises operating the at least one specialized processor to store the one or more execution states in the memory storage.

5. The method of claim 4, further comprising receiving, from the at least one specialized processor, one or more execution states associated with the at least one workload task following execution.

6. The method of claim 5, wherein receiving the one or more execution states comprises:

retrieving, by the CPU, the one or more execution states from the memory storage.

7. The method of claim 1, wherein the resource requirements for executing each workload task of the plurality of workload tasks comprise at least one of memory availability requirement or processing capacity requirement.

8. The method of claim 1, wherein the resource constraints for the at least one specialized processor comprise at least one of a memory availability constraint or a processing capacity constraint.

9. The method of claim 1, wherein the pre-determined time corresponds to a healthy case execution time (HCET).

10. The method of claim 1, wherein configuring the at least one specialized processor comprises at least one of: increase the number of compute resources associated with the at least one specialized processor for executing the at least one remaining workload task, terminating execution of one or more low priority workload tasks on the at least one specialized processor, configuring the one or more low priority workload tasks executing on the at least one specialized processor to use less compute resources.

11. The method of claim 1 further comprises:

determining the at least one specialized processor can execute at least one portion of a workload task within the predetermined time;

in response to determining the at least one specialized processor can execute the at least one portion of the workload task with the predetermined time, transmitting the at least one portion of the workload task to the at least one specialized processor for execution and operating the CPU to execute a remaining portion of the workload task;

otherwise, operating the CPU to select one of:

configuring the resource constraint of the at least one specialized processor to enable the at least one specialized processor to execute at least one portion of a remaining workload task of the one or more remaining workload tasks within the predetermined time, transmitting the at least one portion of the remaining workload task for execution on the at least one specialized processor, and operating the CPU to execute a remaining portion of the remaining workload task; and executing, at the CPU, the one or more remaining workload tasks within the predetermined time.

12. A system for performing time-bounding execution of a workflow, the workflow comprising a plurality of workload tasks, the system comprising at least a central processing unit (CPU) and at least one specialized processor having a parallelized computing architecture, the CPU being operable to:

identify a resource requirement for executing each workload task of the plurality of workload tasks;

determine a resource constraint for the at least one specialized processor, each specialized processor of the at least one specialized processor comprises an accelerator configured for providing parallelized computing processing;

based on the resource requirement and the resource constraint, determine whether the at least one specialized processor can execute each workload task of the plurality of workload tasks within a predetermined time, wherein if the at least one specialized processor can execute at least one workload task within the predetermined time, transmit the at least one workload task to the at least one specialized processor for execution, otherwise, based on the resource requirement and the resource constraint associated with one or more remaining workload tasks, the CPU is operable to select one of:

configuring the at least one specialized processor to execute the one or more remaining workload tasks within the predetermined time, and transmitting the one or more remaining workload tasks for execution on the at least one specialized processor; and executing, on the CPU, the one or more remaining workload tasks within the predetermined time.

13. The system of claim 12, wherein the at least one specialized processor is selected from the group consisting of a graphic processing unit (GPU), a neural processing unit (NPU), a tensor processing unit (TPU), a neural network processor (NNP), an intelligence processing unit (IPU) or a vision processing unit (VPU).

14. The system of claim 12, wherein the at least one specialized processor is further operable to: execute the at least one workload task to generate one or more corresponding execution states.

15. The system of claim 14 further comprises a memory storage in communication with the CPU and at the at least one specialized processor, and the at least one specialized processor is further operable to: store the one or more execution states in the memory storage.

16. The system of claim 15, wherein the CPU is further operable to: receive, from the at least one specialized processor, one or more execution states associated with the at least one workload task following execution.

17. The system of claim 16, wherein receiving the one or more execution states comprises the CPU being operable to:

retrieve one or more execution states from the memory storage.

18. The system of claim 12, wherein the resource requirements for executing each workload task of the plurality of workload tasks comprise at least one of memory availability requirement or processing capacity requirement.

19. The system of claim 12, wherein the resource constraints for the at least one specialized processor comprise at least one of a memory availability constraint or a processing capacity constraint.

20. The system of claim 12, wherein the pre-determined time corresponds to a healthy case execution time (HCET).

21. The system of claim 12, wherein configuring the at least one specialized processor comprises at least one of: increase the number of compute resources associated with the at least one specialized processor for executing the at least one remaining workload task, terminating execution of one or more low priority workload tasks on the at least one specialized processor, configuring the one or more low priority workload tasks executing on the at least one specialized processor to use less compute resources.

* * * * *